(12) United States Patent
Kim et al.

(10) Patent No.: US 11,302,452 B2
(45) Date of Patent: Apr. 12, 2022

(54) NUCLEAR REACTOR COOLING ARRANGEMENT HAVING A STIRLING ENGINE

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Youngin Kim, Daejeon (KR); Youngmin Bae, Daejeon (KR); Hunsik Han, Sejong (KR); Cheongbong Chang, Daejeon (KR); Junewoo Kee, Pohang-si (KR); Minkyu Lee, Daejeon (KR); Kisun Park, Icheon-si (KR); Bonghyun Cho, Daejeon (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

( * ) Notice: Subject to any disclaimer, the term of this patent is extended or adjusted under 35 U.S.C. 154(b) by 36 days.

(21) Appl. No.: 16/620,553

(22) PCT Filed: Jun. 11, 2018

(86) PCT No.: PCT/KR2018/006581
§ 371 (c)(1),
(2) Date: Dec. 9, 2019

(87) PCT Pub. No.: WO2018/230897
PCT Pub. Date: Dec. 20, 2018

(65) Prior Publication Data
US 2020/0141351 A1    May 7, 2020

(30) Foreign Application Priority Data
Jun. 13, 2017    (KR) .......................... 10-2017-0074396

(51) Int. Cl.
*G21D 5/08*    (2006.01)
*G21C 15/18*    (2006.01)
(Continued)

(52) U.S. Cl.
CPC ............... *G21D 5/08* (2013.01); *F02G 1/055* (2013.01); *G21C 9/016* (2013.01); *G21C 15/185* (2019.01);
(Continued)

(58) Field of Classification Search
CPC ........ G21D 5/08; G21C 15/185; G21C 9/016; F02G 1/055
(Continued)

(56) References Cited

U.S. PATENT DOCUMENTS 4,052,854 A * 10/1977 du Pre .................... F02G 1/055
60/524
8,559,583 B1 * 10/2013 Sato ....................... G21C 15/18
376/282
(Continued)

FOREIGN PATENT DOCUMENTS

JP    2016-156729 A    9/2016
KR    20090105540 A    10/2009
(Continued)

OTHER PUBLICATIONS

International Search Report dated Aug. 16, 2018 issued in PCT/KR2018/006581.

*Primary Examiner* — Jack W Keith
*Assistant Examiner* — Daniel Wasil
(74) *Attorney, Agent, or Firm* — Scully Scott Murphy and Presser

(57) ABSTRACT

A reactor cooling and power generation system according to the present disclosure includes a reactor vessel, a heat exchange section formed to receive heat generated from a
(Continued)

core inside the reactor vessel, from a feedwater system through a fluid, and an electric power production section. A Stirling engine is provided to produce electric energy using the energy of the fluid whose temperature has increased while receiving the heat of the reactor. The system is formed to circulate the fluid that has received heat from the core in the heat exchange section through the electric power production section. The system operates even during a normal operation and during an accident of the nuclear power plant. The reactor cooling and power generation system accompanies a nuclear reactor vessel which includes a reactor coolant system, a feedwater system and a steam generator. A turbine produces electric power from the feed water system.

29 Claims, 26 Drawing Sheets

(51) Int. Cl.
| | |
|---|---|
| *F02G 1/055* | (2006.01) |
| *G21C 9/016* | (2006.01) |
| *G21C 3/40* | (2006.01) |
| *G21D 3/04* | (2006.01) |
| *G21D 1/02* | (2006.01) |

(52) U.S. Cl.
CPC ............... *G21C 3/40* (2013.01); *G21C 15/18* (2013.01); *G21D 1/02* (2013.01); *G21D 3/04* (2013.01)

(58) Field of Classification Search
USPC .......................................................... 376/299
See application file for complete search history.

(56) References Cited

U.S. PATENT DOCUMENTS

| | | | |
|---|---|---|---|
| 2008/0110175 A1* | 5/2008 | Graham | F02G 1/053 60/753 |
| 2013/0114776 A1* | 5/2013 | Thinguldstad | G21C 15/185 376/217 |
| 2015/0167648 A1* | 6/2015 | Bergan | F03G 6/065 60/641.15 |
| 2018/0033501 A1* | 2/2018 | Kimura | G21C 15/06 |

FOREIGN PATENT DOCUMENTS

| | | |
|---|---|---|
| KR | 101570080 B1 | 11/2015 |
| KR | 101698343 B1 | 1/2017 |
| KR | 20170001326 A | 1/2017 |

\* cited by examiner

[A-A']

[B-B']

[C-C']

NUCLEAR REACTOR COOLING ARRANGEMENT HAVING A STIRLING ENGINE

CROSS-REFERENCE TO RELATED APPLICATION

Pursuant to 35 U.S.C. § 119(a), this application claims the benefit of the earlier filing date and the right of priority to Korean Patent Applications No. 10-2017-0074396, filed on Jun. 13, 2017, the contents of which are incorporated by reference herein in their entirety.

BACKGROUND

1. Technical Field

The present disclosure relates to a reactor cooling method, and more particularly, to power production using heat generated in a core and transferred to a reactor or reactor coolant system during a normal operation, and emergency power production and reactor cooling using heat generated in the core and transferred to the reactor or the reactor coolant system during an accident.

2. Description of the Related Art

Nuclear reactors are divided into loop type reactors (e.g., commercial reactors: Korea) in which major components (steam generator, pressurizer, pump, etc.) are installed outside a reactor vessel and integral reactors (e.g., SMART reactors: Korea) in which the major components are installed inside a reactor vessel.

In addition, Nuclear power plants are divided into active plants and passive plants depending on the implementation of a safety system. An active plant is a reactor using an active component such as a pump operated by electric power of an emergency diesel generator (EDG) or the like to drive a safety system, and a passive plant is a plant using a passive component operated by gravity, gas pressure or the like to drive a safety system.

A passive safety system in a passive plant may maintain the reactor in a safe manner only with a natural force built in the system without an operator action or an AC power source of safety grade such as an emergency diesel generator for more than a period of time (72 hours) required by regulatory requirements in the event of an accident, After 72 hours, using an operator action and a non-safety systems might be allowed to maintain the function of the safety systems and an emergency DC power source (battery).

Unlike a general thermal power plant where heat generation is stopped when fuel supply is stopped, a reactor in a nuclear power plant generates residual heat from a reactor core for a significant period of time by a fission product produced and accumulated during a normal operation even when a fission reaction is stopped in the reactor core. Accordingly, a variety of safety systems for removing the residual heat of the core during an accident are installed in the nuclear power plant.

In case of an active nuclear power plant (Conventional Nuclear Power Plant of Korea), a plurality of emergency diesel generators are provided in preparation for a case of interruption of electric power supply from the inside or outside at the time in an accident, and most active nuclear power plants use a pump to circulate cooling water, and thus a large-capacity emergency AC power source (a diesel generator) is provided due to the high power requirements of those active components. An operator action allowance time for an active nuclear reactor is estimated about 30 minutes.

In order to exclude active components such as a pump that requires a large amount of electricity, a driven force such as gas pressure or gravity is introduced in a passive nuclear reactor (U.S. Westinghouse AP1000, Korean SMART) that has been developed or is being developed to enhance the safety of the nuclear power plant, and thus a large amount of power is not required other than small components such as a valve, which is essentially required for the operation of a passive safety system. However, to enhance the safety in a passive nuclear power plant, an operator action allowance time is drastically extended from 30 minutes to 72 hours or longer, and an emergency active power source (diesel generator) is excluded, and an emergency DC power source (battery) is adopted. And thus the emergency DC power source should be maintained for more than 72 hours. Therefore, the emergency power source capacity required per unit time in a passive nuclear power plant is relatively small compared to an active nuclear power plant, but it is very large in terms of the battery capacity because the emergency power should be supplied for 72 hours or more.

In the other hand, a residual heat removal system (auxiliary feedwater system or passive residual heat removal system) is employed as a system for removing the heat of a reactor coolant system (the sensible heat of the reactor coolant system and the residual heat of the core) using a residual heat removal heat exchanger connected to a primary system or secondary system when an accident occurs in various nuclear power plants including an integral reactor. (AP1000: U.S. Westinghouse, commercial loop type nuclear power plant and SMART reactor: Korea)

Furthermore, a safety injection system is employed as a system for directly injecting cooling water into the reactor coolant system in case of a loss-of-coolant accident to maintain a water level of the reactor core and removing the heat of the reactor coolant system (the sensible heat of the reactor coolant system and the residual heat of the core) using the injected cooling water. (AP1000: U.S. Westinghouse, commercial loop type and SMART reactor: Korea)

Moreover, a reactor containment cooling system or spray system is a system for condensing steam using cooling or spraying to suppress a pressure rise when a pressure inside the reactor containment rises due to an accident such as a loss-of-coolant accident or a steam-line-break accident. Additionally, there are a method of directly spraying cooling water into the reactor containment (commercial loop type reactor: Korea), a method of inducing steam discharged in the reactor containment into a suppression tank (commercial boiling water reactor), a method of using a heat exchanger installed inside or outside the reactor containment (reinforced concrete containment building)) (APR+: Korea), a method of using a surface of the steel containment vessel as a heat exchanger (AP1000: U.S. Westinghouse), or the like.

As described above, various safety systems configured with multiple trains with two or more trains are installed in each system such as a residual heat removal system and a safety injection system for cooling the reactor coolant system (including the reactor vessel) to protect the reactor core at the time of an accident. However, in recent years, there has been a growing demand for safety enhancement of nuclear power plants due to the impact of Fukushima nuclear power plant (boiling water reactor) accident and the like, and thus there is a rising demand for safety facilities against a severe accident such as an external reactor vessel cooling system even in a pressurized water reactor (PWR) with a very low risk of leakage of large amounts of radioactive materials due to employing a very large-internal-volume nuclear reactor containment.

In detail, various safety facilities are provided to relieve an accident in case of the accident. In addition, each of the safety facilities is configured with multiple trains, and the probability that all systems fail simultaneously is very small. However, as a public requirement for the safety of nuclear power plants increases, safety facilities have been enhanced in preparation for a severe accident even with a very low probability of occurrence.

The external reactor vessel cooling system is a system provided to cool the outside of reactor vessel during core meltdown to prevent damage of the reactor vessel, assuming that a serious damage occurs in the core cooling function and a severe accident that the core is melted occurs since various safety facilities do not adequately perform functions due to multiple failure causes at the time of an accident. (AP1000 U.S. Westinghouse)

When the reactor vessel is damaged, a large amount of radioactive material may be discharged into the reactor containment, and a pressure inside the reactor containment may rise due to an large amount of steam generated by corium (melted core)-water reaction and gas formed by the core melt-concrete reaction. The reactor containment serves as a final barrier to prevent radioactive materials from being discharged into an external environment during an accident. When the reactor containment is damaged due to an increase in internal pressure, a large amount of radioactive material may be released to an external environment. Therefore, the external reactor vessel cooling system performs a very important function of suppressing radioactive materials from being discharged into the reactor containment and an increase of the internal pressure during a severe accident to prevent radioactive materials from being discharged into an external environment.

The external reactor vessel cooling system which is adopted in many countries is a system in which cooling water is filled in the reactor cavity located at a lower part of the reactor vessel and the cooling water is introduced into the cooling flow path in a space between the thermal insulation material and the reactor vessel and then steam is discharged to an upper part of the cooling flow path. In addition, a method of injecting a liquid metal at the time of an accident to mitigate the critical heat flux phenomenon, a method of pressurized cooling water to induce single phase heat transfer, a method of modifying a surface of the external reactor vessel to increase the heat transfer efficiency, a method of forming a forced flow, and the like, may be taken into consideration.

On the other hand, Stirling engine was developed by Robert Stirling (1816) as an external combustion engine, which tightly holds gas in a closed cylinder and drives an actuator (a type of piston) and a piston according to the strokes of heating, expansion, cooling and compression to produce power.

The Stirling engine is classified into α type, β type, γ type, and dual-acting type according to the configuration of the cylinders and the pistons, and classified into a mechanically driven Stirling engine (kinematic engine) and a free piston Stirling engine (FPSE), and the like depending on the piston movement.

Stirling engines may also operate with heat having a small temperature difference (e.g., 2° C.) and have a very high theoretical efficiency and low noise and low vibration compared to internal combustion engines.

In addition, the Stirling engine may use various heat sources such as solar heat and geothermal heat, and the use of environmentally friendly heat sources has an advantage of low discharge of pollutants.

In an external reactor vessel cooling system in the related art, since a thermal insulation material has to perform an appropriate thermal insulation function during a normal operation of the nuclear power plant, a flow path is sealed such that the inlet and outlet flow paths formed in the thermal insulating material at the time of an accident must be properly opened in a timely manner, and there is a delay time for filling the reactor cavity, and the heat removal ability may be reduced due to a critical heat flux phenomenon or the like while evaporating cooling water to form a steam layer on the external reactor vessel.

In addition, there is also a research on cooling the external reactor using a liquid metal, but the liquid metal method has difficulties in the maintenance of the liquid metal. In addition, the method of cooling the external reactor using a pressurization method has difficulties in the application of a natural circulation flow, and the method of modifying the reactor vessel surface has difficulties in the fabrication and maintenance of the surface, and the forced flow method has a disadvantage in that it must be supplied with electric power.

On the other hand, the large-capacity steam turbine method has a large size of the facility, thus increasing the cost when the strengthened seismic design is applied thereto. Therefore, there is a limitation in being designed to produce electric power during a normal operation and during an accident of the nuclear power plant.

In addition, since an external reactor vessel cooling system in the related art is operated by an operator action at the time of an accident, various instruments and components for monitoring the accident are required for the operation, and a probability that a system in a standby mode fails to operate at the time of an accident is higher than a probability that a system being operated is stopped to operate at the time of an accident.

Accordingly, the present disclosure presents a reactor cooling and power generation system in which a large-scale turbine power generation facility in the related art is maintained almost same design, and a small-scale power generation facility including the Sterling engine is additionally installed to receive heat generated and discharged from the core during a normal operation or during an accident of the nuclear power plant.

SUMMARY

An object of the present disclosure is to provide a reactor cooling and power generation system having system reliability in which safety class or seismic design are easily applicable, and reactor cooling is carried out while continuously operating during a normal operation as well as during an accident to produce emergency power.

Another object of the present disclosure is to propose a reactor cooling and power generation system having enhanced safety in which residual heat of a certain scale or more is removed during a normal operation as well as during an accident.

Still another object of the present disclosure is to propose a nuclear power plant having economic efficiency and safety due to the downsizing and reliability enhancement of an emergency power system of the nuclear power plant.

A reactor cooling and power generation system according to the present disclosure may include a reactor vessel, a heat exchange section formed to receive heat generated from a core inside the reactor vessel through a fluid, and an electric power production section comprising a Sterling engine formed to produce electric energy using the energy of the fluid whose temperature has increased while receiving the heat of the reactor, wherein the system is formed to circulate the fluid that has received heat from the core through the electric power production section, and operate even during a normal operation and during an accident of the nuclear power plant to produce electric power.

According to an embodiment, the electric power produced during the normal operation of the nuclear power plant may be supplied to an internal and external electric power system and an emergency battery.

According to an embodiment, the electric energy charged in the emergency battery may be formed to supply an emergency electric power as an emergency power source during an accident. Furthermore, the electric power produced during an accident of the nuclear power plant may be formed to be supplied to an emergency power source of the nuclear power plant.

According to an embodiment, the emergency power source may be formed to be supply an electric power source for the operation of a nuclear safety system or valve manipulating for the operation of the nuclear safety system or monitoring the nuclear safety system or operation of the reactor cooling and power generation system during an accident of the nuclear power plant.

According to an embodiment, a seismic design of seismic category I, II or III may be applied thereto, and a safety grade of safety class 1, 2 or 3 may be applied thereto.

According to an embodiment, the system may further include a first discharge section connected to the heat exchange section, wherein the first discharge section is formed to allow at least a part of the fluid excessively supplied to the electric power production section to bypass the electric power production section.

According to an embodiment, the heat exchange section may be formed to surround at least a part of the reactor vessel, and may have a shape capable of cooling an outer wall of the reactor vessel formed to receive heat discharged from the reactor vessel that has received heat generated from the core. Furthermore, at least a part of the shape of the heat exchange section having a shape of cooling the outer wall of the reactor vessel may include a cylindrical shape, a hemispherical shape, a double vessel shape, or a mixed shape thereof.

According to an embodiment, the system may be connected to an in-containment refueling water storage tank (IRWST) to supply refueling water to the heat exchange section having a shape capable of cooling the outer wall of the reactor vessel. Furthermore, a second discharge section may be provided in a heat exchange section having a shape capable of cooling the outer wall of the reactor vessel, and the second discharge section may be formed to discharge the refueling water supplied from the in-containment refueling water storage tank (IRWST).

According to an embodiment, a coating member may further be formed on the heat exchange section having a shape capable of cooling the outer wall of the reactor vessel to prevent the corrosion of the reactor vessel. A surface of the coating member may be chemically treated to increase a surface area thereof. Furthermore, a heat transfer member may further be formed to efficiently transfer heat discharged from the reactor vessel. A surface of the heat transfer member may be chemically treated to increase a surface area thereof.

According to an embodiment, the heat exchange section may be provided inside the reactor vessel, and may have a shape capable of cooling an inside of the reactor vessel formed to receive heat discharged from a reactor coolant system inside the reactor vessel that has received heat generated from the core.

According to an embodiment, the system may be connected to an in-containment refueling water storage tank (IRWST) to supply refueling water to the heat exchange section having a shape capable of cooling an inside of the reactor vessel. Furthermore, a second discharge section may be provided in a heat exchange section having a shape capable of cooling the inside of the reactor vessel, and the second discharge section may be formed to discharge the frefueling water supplied from the in-containment refueling water storage tank (IRWST).

According to an embodiment, the system may further include an evaporator section connected to the heat exchange section, wherein the evaporator section is formed to exchange heat with an inner fluid of the heat exchange section and an inner fluid of the electric power production section, and comprises a first circulation section formed to circulate through the heat exchange section and the evaporator section; and a second circulation section formed to circulate through the evaporator section and the electric power production section.

According to an embodiment, at least one of the first circulation section and the second circulation section may be formed to circulate by a single-phase fluid.

According to an embodiment, the heat exchange section may further include a core catcher, and the core catcher may be formed to receive and cool a melted core when the core is melted in the reactor vessel.

According to an embodiment, the Stirling engine may include a power generation section including a cylinder having a reciprocator and a piston configured to generate motive power by heat received through the fluid that has received heat, and a power transmission section, and an electricity generation section configured to convert mechanical energy generated by the power generation section into electrical energy.

According to an embodiment, the Stirling engine may include a high temperature section and a low temperature section respectively filled with working gas, and formed with spaces partitioned from each other inside a cylinder, and working gas filled in the high temperature section and the low temperature section may be formed to communicate with each other, and formed to move a reciprocator and a piston according to the communication of the working gas.

According to an embodiment, the Stirling engine may further include a regenerative heat exchange section, and the regenerative heat exchange section may transfer and store heat stored in the working gas in the regenerative heat exchange section when the working gas moves from the high temperature section to the low temperature section, and transfer the heat stored in the regenerative heat exchange section to the working gas when the working gas returns from the low temperature section to the high temperature section.

According to an embodiment, a fan or a pump may be provided in the low temperature section, and the fan or the pump may be formed to supply a cooling fluid to the low temperature section to exchange heat with the working gas of the low temperature section. The cooling fluid may include air, pure water, seawater, or a mixture thereof.

According to an embodiment, the system may further a condensate storage section at a lower portion of the electric power production section to collect condensate generated by condensing the fluid heat-exchanged in the electric power production section.

According to an embodiment, condensate in the condensate storage section may be supplied to the heat exchange section by gravity or the power of the pump.

A nuclear power plant according to the present disclosure may include a reactor vessel, a heat exchange section formed to receive heat generated from a core inside the reactor vessel through a fluid, and an electric power production section comprising a Sterling engine formed to produce electric energy using the energy of the fluid whose temperature has increased while receiving the heat of the reactor, wherein the system is formed to circulate the fluid that has received heat from the core in the heat exchange section through the electric power production section, and formed to operate even during a normal operation and during an accident of the nuclear power plant to produce electric power.

The reactor cooling and power generation system according to the present disclosure is formed to drive an electric power production section including a Sterling engine formed to produce electric energy using the energy of a fluid in a small scale facility. A heat exchange section and an electric power production section of the present disclosure may continuously operate not only during normal operation but also during an accident to cool residual heat and generate emergency power, thereby improving system reliability. A heat exchange section for facilitating the application of safety class and seismic design with a small scale facility, and continuously operating during an accident as well as during a normal operation and performing reactor cooling by the application of safety class or seismic design may be included therein, thereby improving the reliability of the nuclear power plant.

The reactor cooling and power generation system according to the present disclosure may be designed to remove residual heat of a certain scale or more generated from the core of the reactor, and continuously operated not only during a normal operation but also during an accident to reduce a probability of actuation failure at the time of an accident, thereby improving the safety of the nuclear power plant.

The nuclear power plant according to the present disclosure may improve the economic efficiency of the nuclear power plant through the downsizing of an emergency power system through the reactor cooling and power generation system.

BRIEF DESCRIPTION OF THE DRAWINGS

FIGS. 8 through 10 are conceptual views illustrating various embodiments of a Stirling engine applied to a reactor cooling and power generation system of the present disclosure.

DETAILED DESCRIPTION OF THE EMBODIMENTS

Figure 1A:
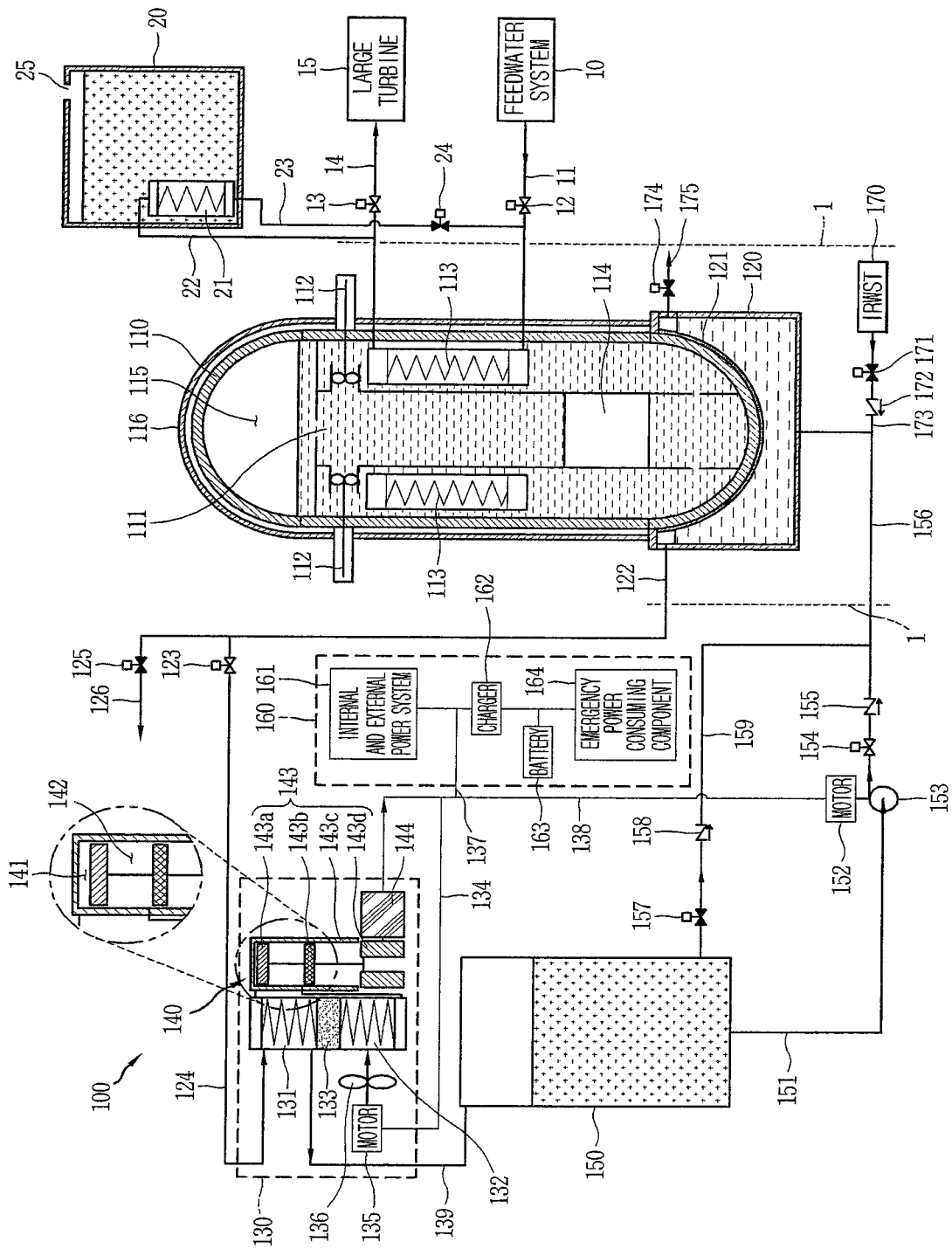
FIG. 1A is a conceptual view of a reactor cooling and power generation system associated with an embodiment of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Hereinafter, a reactor cooling and power generation system provided with an heat exchange sections 120, 220, 320a, 320b, 320c, 320d, 320e, 420 having a shape capable of cooling an external reactor vessel formed to receive heat discharged from a reactor vessel that has received heat generated in a core to operate even during a normal operation and during an accident of the nuclear power plant so as to produce power will be described in more detail with reference to FIGS. 1A through 1E, FIGS. 2A through 2E, FIGS. 3A through 3E, and FIG. 4.

FIG. 1A is a conceptual view of a reactor cooling and power generation system 100 associated with an embodiment of the present disclosure.

In an embodiment of the present disclosure, the reactor coolant system 111 may be circulated inside the reactor vessel 110. In addition, a heat insulator 116 surrounding a part of the reactor vessel 110 may be formed. Furthermore, the inside of the reactor vessel 110 may be formed to have a core 114. The core 114 refers to a nuclear fuel. The reactor vessel 110 may be a pressure vessel designed to withstand high temperatures and pressures because electric power is produced by heat generated while performing fission in the core 114.

Even when a control rod is inserted into the core 114 to stop the core 114 during a nuclear power plant accident, residual heat may be generated for a considerable period of time. When it is assumed that various safety and non-safety systems do not operate at the time of an accident of the nuclear power plant though having a very low probability of occurrence, cooling water inside the reactor vessel 110 may be lost to increase the temperature of the nuclear fuel, thereby causing a core meltdown phenomenon.

On the other hand, during a normal operation of the nuclear power plant, heat may be received from the reactor coolant system 111 to produce steam. The steam generator 113 may be a pressurized water reactor. Further, the steam produced by the steam generator 113 may be steam that is phase-changed by receiving water a feedwater system 10 through a main feedwater line 11 and an isolation valve 12 connected thereto. The steam produced by the steam generator 113 is passed through a main steam line 14 connected to an isolation valve 13 and supplied to a large turbine 15 and a large generator (not shown) to produce electric power while the fluid energy of the steam is converted into electric energy through mechanical energy. However, although the pressurized water reactor is illustrated in the present disclosure, the technology of the present disclosure is not limited to the pressurized water reactor.

In addition, a reactor coolant pump 112 may circulate coolant that fills the inside of the reactor vessel 110. A pressurizer 115 provided inside the reactor vessel 110 may be formed to control the pressure of the reactor coolant system 111.

Moreover, a passive residual heat removal system including an emergency cooling water storage section 20 and a heat exchanger 21 may be provided therein to discharge the heat of the reactor coolant system 111 to the emergency cooling water storage section 20 through the steam generator by natural circulation due to a two-phase flow received through lines 22, 23 and the opening and closing of a valve 24 during an accident. Further, when steam is generated while emergency cooling water is evaporated by heat transferred to the emergency cooling water storage section 20, the steam may be released through a steam discharge section 25 to discharge the transferred heat to the atmosphere.

The reactor cooling and power generation system 100 is in an actuation state even during a normal operation and heat is continuously transferred to the reactor vessel 111 by residual heat generated from the core 114 until the temperature of the reactor vessel 110 is significantly reduced to reach a safe state, and thus the reactor cooling and power generation system 100 continues to operate.

Accordingly, an operator action for the reactor cooling operation, various measuring instruments and control systems, valve operation or pump start and the opening and closing of a thermal insulation material may not be required as in a conventional method, and thus a probability of actuation failure of the reactor cooling and power generation system 100 is greatly reduced to improve the safety of the nuclear power plant.

In addition, since emergency power can be stably produced by the reactor cooling and power generation system 100 until the temperature of the reactor vessel is reduced to reach a safe state during an accident, the capacity of an emergency DC battery (emergency electric power source) may be decreased to improve the economic efficiency of the nuclear power plant and improve the reliability of an emergency power system of the nuclear power plant by securing the emergency power supply means of a safety system, thereby improving the safety of the nuclear power plant.

In detail, in case of a passive nuclear power plant, emergency power required during an accident is less than about 0.05% compared to the power generation capacity generated from the nuclear power plant during a normal operation, but it is designed to use battery for 72 hours or more, and thus a very large sized battery is required, having a disadvantage of increasing the cost. However, the reactor cooling and power generation system 100 may produce an appropriate level of emergency power using residual heat continuously generated from the core 114 (an amount of residual heat generated is several % (initial shutdown) to 1/several % (after 72 hours subsequent to shutdown) compared to a normal amount of thermal power).

Moreover, when power is produced using the in-vessel cooling and power generation system 100, the power production amount is several tens of kWe to several MWe, and the capacity is less than 1/several % compared to the feedwater system 10 and the large turbine 15 for a normal operation of the nuclear power plant. This system 100 has almost no influence on the operation of nuclear power plant, and therefore, even when this system 100 fails during a normal operation. Than is to say, this system 100 has a capacity less than 1/several %, so it has little effect on a nuclear power plant operation.

In addition, when power is produced using the reactor cooling and power generation system 100, it may be constructed in a small scale compared to the large capacity feedwater system 10 and the large turbine 15 for producing normal power, and therefore, it is easy to apply seismic design and safety class, and cost increase is not so great due to small facilities even when seismic design and safety class are applied.

Besides, even in the event of an accident, it operates continuously as a normal operation without any additional valve operation, and therefore, during an accident, the probability of actuation failure of valves, pumps, and the like for the actuation of the reactor cooling system in the related art, and the probability of actuation failure or breakdown due to an error measuring instruments and control signals may be significantly reduced.

Moreover, when the heat exchange section 120 and the electric power production section 130 fail due to the occurrence of a severe accident, a flow path through the in-containment refueling water storage tank (hereinafter, referred to as IRWST) 170 and the first discharge section 175 is already formed, and therefore, it may be formed to efficiently supply and discharge a flow rate of cooling water by a simple operation such as opening or closing a valve according to an operator action, and used for the cooling of the reactor coolant system 111 and core melt including the reactor vessel 110.

In particular, in case of an integral reactor, a lower space of the inner and outer reactor vessel has a simple structure, and the lower or other space of the inner and outer reactor vessel is easily secured, and thus it is easier to apply the reactor cooling and power generation system 100 of the present disclosure.

In addition, the reactor cooling and power generation system 100 may be used as an additional residual heat removal means that performs the role of removing the residual heat of the reactor core 114 during an accident.

Hereinafter, the reactor cooling and power generation system 100 according to the present disclosure will be described in detail.

The inside of the reactor containment boundary 1 (not shown) (hereinafter also referred to as a containment or reactor containment) may include a reactor vessel 110, a heat exchange section 120, and an IRWST 170.

The heat exchange section 120 may be formed to receive heat generated from the core 114 inside the reactor vessel 110 through a fluid. In an embodiment, the heat exchange section 120 may be configured to enclose at least a part of the reactor vessel 110. In other words, the heat exchange section 120 may be formed to receive heat discharged from the reactor vessel 110 and cool the outer wall of the reactor vessel 110.

On the other hand, the outside of the reactor containment boundary 1 includes an electric power generation section 130 and a condensate storage section 150. The electric power generation section 130 may be connected to the motors 135, 152 and the power (electric power) system 160 to supply power. The power system 160 may include an internal and external electric power system 161, a charger 162, an emergency power consuming component 164, and an emergency battery 163. However, some of the components illustrated as being installed outside the reactor containment boundary 1 may be disposed inside the reactor containment boundary 1 depending on the layout characteristics of the nuclear power plant.

The reactor vessel 110 formed inside the reactor containment boundary 1 may be a pressure vessel formed to circulate the reactor coolant of the reactor coolant system 111 and formed to include the core 114 therein, and designed to withstand high pressures.

The heat exchange section 120 is provided outside the reactor vessel 110 to receive heat transferred from the reactor coolant system 111 to the reactor vessel 110 at an outside of the reactor vessel 110. In detail, residual heat produced in the core 114 may be transferred to an inner surface of the reactor vessel 110 through the circulation of the reactor coolant system 111, and the transferred heat may be transferred to an outer surface of the reactor vessel 110 by the conduction heat transfer of the reactor coolant system 110 and then transferred to the heat exchange section 120, thereby allowing the heat exchange section 120 to perform cooling for the reactor vessel 110. In other words, the heat exchange section 120 may perform cooling on the reactor vessel 110 and reactor coolant inside the reactor vessel 110 during a normal operation of the nuclear power plant, and perform cooling on the reactor vessel 110, reactor coolant and core melt during a nuclear accident.

In an embodiment, the heat exchange section 120 may be formed to surround a lower portion of the reactor vessel 110 and may be a heat exchange section having a shape capable of cooling the outer wall of the reactor vessel 110 using a fluid that receives heat discharged from the reactor vessel 110.

In another embodiment, the heat exchange section may be provided inside the reactor vessel 110, and may have the form of a heat exchange section provided inside the reactor vessel formed to receive heat from the reactor coolant system 111 inside the reactor vessel 110 that has received heat generated from the core 114. The heat exchange section having the form of a heat exchange section provided inside the reactor vessel will be described later with reference to FIGS. 5A through 5C, 6A through 6C, and 7A through 7C.

In an embodiment, when the heat exchanging section 120 is a heat exchanging section having a shape capable of cooling the outer wall of the reactor vessel 110, the shape of the heat exchange section 120 may be cylindrical. However, the shape of the heat exchange section 120 is not limited to a cylindrical shape, and at least a part of the heat exchange section 120 may include a cylindrical shape, a hemispherical shape, and a double vessel shape. In addition, the heat exchange section 120 having a shape capable of cooling the outer wall of the reactor vessel may further include a coating member 121 for preventing corrosion or increasing heat transfer efficiency.

In an embodiment, the surface of the coating member 121 may be reformed in various ways, and may also be processed in an uneven shape (cooling fin) to increase the heat transfer surface area. Further, the surface of the coating member 121 may further include a heat transfer member (not shown) that can be chemically treated to increase the surface area so as to improve heat transfer efficiency. In other words, the surface of the coating member 121 and the heat transfer member may be chemically treated to increase the surface area, thereby efficiently performing heat transfer.

In addition, the heat exchange section 120 is provided with a discharge pipe 122, and the discharge pipe 122 may be connected to the heat exchange section 120 and the electric power production section 130 to supply the fluid of the heat exchange section 120 to the electric power production section 130. The discharge pipe 122 may be branched to a pipe 124 passing through the valve 123 and connected to the electric power production section 130.

On the other hand, the discharge pipe 122 may include a first discharge section 126 connected to the valve 125, and the first discharge section 126 may be formed to discharge at least a part of the fluid excessively supplied to the electric power production section 130 or allow it to bypass the electric power production section 130. Specifically, the first discharge section 126 may be configured discharge a part of fluid (gas, steam) when a pressure of the system rises or the fluid (liquid) is excessively supplied to a pipe for discharging the fluid (gas, steam) from the heat exchange section 120 to the outside of the reactor containment (not shown). In the present disclosure, the first discharge section 126 is illustrated to discharge a fluid to the outside of the reactor containment (not shown), but may also be formed to allow the discharged fluid to bypass the power production section 130 and then condensate the fluid for reuse according to the characteristics of the nuclear power plant.

Moreover, the heat exchange section 120 may be connected to the IRWST 170 to supply refueling water through the pipe 173. Specifically, the IRWST 170 may be connected to the valve 171 and the check valve 172. As a result, a second discharge section 175 connected to the valve 174 may be provided to discharge the refueling water supplied from the IRWST 170 to the pipe 173 through the second discharge section 175 during an accident.

Specifically, the second discharge section 175 is configured to cool the inside and outside of the reactor vessel 110 even when cooling and power generation using the heat exchange section 120 and the electric power production section 130 is not carried out due to a failure thereof or the like during a severe accident on a pipe for discharging the refueling water received from the IRWST 170 into the reactor containment (not shown) as a fluid (gas/steam, a mixture of gas/steam and liquid/hot water or liquid/hot water), and the like.

Meanwhile, the fluid may be transferred and injected into the electric power production section 130 from the heat exchange section 120. The electric power production section 130 may be formed to produce electric energy using the energy of the fluid, and may include a Stirling engine 140.

Specifically, the Stirling engine 140 may include a battery (not shown) formed to provide power for an initial engine operation. In addition, the Stirling engine 140 may have a heat exchanger provided adjacent to the Stirling engine 140. The heat exchanger includes a first heat exchange section 131 and a second heat exchange section 132.

The first heat exchange section 131 of the heat exchanger may be connected to a high temperature section 141 and formed to transfer the heat of the heat exchange section 120, namely, heat generated from the core 114, to the high temperature section 141, and a fluid that has exchanged heat with the high temperature section 141 may be discharged to a pipe 139. Furthermore, the second heat exchange section 132 of the heat exchanger may be connected to a low temperature section 142 to discharge the heat of the working gas transferred from the low temperature section 142 to the outside.

The Stirling engine 140 may further include a regenerative heat exchange section 133 (regenerator). The regenerative heat exchange section 133 is a component for increasing the performance and efficiency of the Stirling engine 140, and the working gas reciprocated between the high temperature section 141 and the low temperature section 142 may be located between the first heat exchange section 131 and the second the second heat exchange section 132 that receive heat (heating, cooling).

The regenerative heat exchange section 133 may block heat flowing from the high temperature section 141 to the low temperature section 142 to the maximum to maintain a large temperature difference. The regenerative heat exchange section 133 may store the heat of the working gas when the working gas moves from the high temperature section 141 to the low temperature section 142, and transfer heat to the working gas again when the working gas comes to the high temperature section 141 from the low temperature section 142. Specifically, the efficiency of the Stirling engine 140 is determined by a temperature difference between the high temperature section 141 and the low temperature section 142, and thus the efficiency may be maximized when the gas returning from the low temperature section 142 to the high temperature section 141 is not reheated. In this regard, the regenerative heat exchange section 133 has a close relationship with the performance of the Stirling engine 140.

On the other hand, the Stirling engine 140 includes a power generation section 143 and an electricity generation section 144. The power generation section 143 may include a cylinder 143c including a reciprocator 143a, which is a type of piston formed to generate power while working gas go through the processes of heating, expansion, cooling, and compression) by heat (heating, cooling) received through the fluid that has received heat, and a piston 143b, and a power transmission section 143d. The power transmission section 143d may transfer a reciprocating movement of the reciprocator 143a and the piston 143b inside the cylinder 143c to a connecting rod to be converted into a rotational movement.

Meanwhile, the electricity generation section 144 is formed to convert mechanical energy for performing a rotational movement generated by the power generation section 143 into electrical energy. In detail, the electricity generation section 144 is connected to a power section shaft and a generator shaft to convert mechanical energy into electrical energy. In other words, the Sterling engine 140 may receive heat with a predetermined scale from the inside of the reactor vessel 110 to produce electricity in consideration of characteristics during a normal operation and during an accident of the nuclear power plant.

Moreover, the Stirling engine 140 may include a high temperature section 141 and a low temperature section 142, which are respectively filled with the working gas therein, and formed with spaces partitioned from each other inside the cylinder 143c, and the working gas filled in the high temperature section 141 and the low temperature section 142 are formed to communicate with each other through the first heat exchange section 131, the second heat exchange section 132 and the regenerative heat exchange section 133, and formed to move the reciprocator 143a and the piston 143b in accordance with the communication of the working gas.

In addition, the Stirling engine 140 may further include a regenerative heat exchange section 133 that transfers the stored heat to the working gas when the working gas returns from the low temperature section 142 to the high temperature section 141. Moreover, the high temperature section 141 and the low temperature section 142 are respectively formed in closed spaces inside the cylinder, and the high temperature section and the low temperature section are respectively filled with the working gas. In another embodiment, the high temperature section and the low temperature section may be formed separately inside two cylinders according to circumstances.

On the other hand, as illustrated in the drawing, the high temperature section 141 and the low temperature section 142 may be formed in spaces partitioned from each other inside one cylinder 143c (beta method). The working gas may be any one of air, helium, and hydrogen.

Besides, the cylinder 143c of the Stirling engine 140 may have a cylindrical shape with one side opened, and may include a piston 143b disposed at a boundary position between the high temperature section 141 and the low temperature section 142 to partition the high temperature section 141 from the low temperature section 142 inside the cylinder 143c, and a reciprocator 143a disposed inside the cylinder 143c to be spaced apart from the piston 143b. The piston 143b and the reciprocator 143a may be independently moved along the inside of the cylinder 143c by the working gas.

The Stirling engine 140 may include a power transmission section 143d rotatably disposed so as to be spaced apart from the opening side of the cylinder 143c. The reciprocating linear kinetic energy of the piston 143b and the reciprocator 143a may be converted into a rotational movement to implement the continuous operation of the Stirling engine 140.

The high temperature section 141 and the low temperature section 142 may be connected to each other by a connecting flow path. For example, one end portion of the connecting flow path is connected to the high temperature section 141, the other end portion of the connecting flow path is connected to the low temperature section 142, and thus the working gas flows from the high temperature section 141 to the low temperature section 142 or from the high temperature section 142 to the high temperature section 141 through the connecting flow path. In addition, the Sterling engine 140 may further include a regenerative heat exchange section 133 disposed in the connecting flow path.

Moreover, the low temperature section 142 is provided with a fan 136 or a pump (not shown), and the fan 136 or the pump supplies cooling fluid to the low temperature section 142 to exchange heat with the working gas of the low temperature section 142. In detail, the fan 136 or the pump may be operated by supplying electric power produced by the electricity generation section 144 of the Stirling engine 140 to the motor 135 through a connected line 134.

In an embodiment, the cooling fluid may include air, pure water, seawater, or a mixture thereof, and may not be limited to the described materials, and any material may be used without particular limitation as long as it is heat exchangeable with the low temperature section 142.

The basic operation of the Stirling engine 140 by the Stirling cycle principle consists of heating, expansion, cooling and compression processes. The above processes will be described in detail as follows.

Heating: When heating the high temperature section 141 in which the working gas mainly is collected, the temperature rises and the piston 143b of the high temperature section 141 is pushed out to generate work or power.

Expansion: Subsequently, while the temperature of the high temperature section 141 rises, the piston 143b is pushed out, and at the same time, the working gas moves to the low temperature section 142 to push out the reciprocator 143a. At this time, the working gas stores heat in the regenerative heat exchange section 133, and at the same time, starts to be cooled while passing through a side of the low temperature section 142.

Cooling: Though the reciprocator 143a is pushed out while the working gas continues to move to the low temperature section 142, the piston 143b starts to return to its original position as the working gas of the high temperature section 141 becomes insufficient.

Compression: When the working gas is mainly collected in the low temperature section 142, the temperature of the working gas is lowered and gradually compressed, so that the reciprocator 143a returns to its original position while the working gas moves to the high temperature section 141 little by little.

As described above, as the Stirling engine 140 moves by one cycle of the heating-expansion-cooling-compression processes, and the piston 143b and the reciprocator 143a are mechanically connected to each other, a continuous cycle operation that generates power may be achieved in the power transmission section 143d.

Furthermore, some types of the Stirling engine 140 has been illustrated, but the present disclosure is not limited to the Stirling engine 140 as in a presented manner, and various types of Stirling engines may also be applied thereto.

In an embodiment, electric power produced in the electric power production section 130 may be variably constructed in consideration of a heat transfer rate due to heat generated in the core 114 supplied during an accident to control a load of the power production section 130 according to the heat transfer rate.

In addition, the Sterling engine 140 of the electric power production section 130 may be a small-capacity electric power production facility, which makes it easy to apply seismic design or safety class described below. Various embodiments of the Stirling engine applied to the reactor cooling and power generation system of the present disclosure will be described with reference to FIGS. 8 through 10.

The electric power that can be generated by the power production section 130 has a capacity of several tens of kWe to several MWe, which is less than 1% compared to the large-capacity feedwater system 10 and the large turbine 15 for producing the normal power of the nuclear power plant, and even when the facility operates or fails, there is little influence on the operation of the large capacity feedwater system 10 and the large turbine 15 for producing normal nuclear power.

In other words, the large capacity feedwater system 10 and the large turbine 15 for producing normal power are one of the biggest large-scale facilities of the nuclear power plant, and applying the seismic design and safety class above a certain scale to the whole facilities is very uneconomical because it causes a huge cost increase. On the other hand, in case of the reactor cooling and power generation system 100 to which the Sterling engine 140 is applied, a size of the system 100 is much smaller than that of the feedwater system 10 and the large turbine 15, and thus it is easy to apply seismic design or safety class thereto, and the increased cost by applying seismic design or safety class is not so large. The Sterling engine 140 may be continuously driven to supply emergency power even when it is difficult to supply power due to the occurrence of an earthquake since seismic design is applied to the reactor cooling and power generation system 100, and the Sterling engine 140 may be continuously driven to supply emergency power even when various accidents occur since safety class is applied to secure system reliability.

Considering that electric power required in case of a passive nuclear power plant during an accident is several tens of kWe though the emergency power has a difference according to the characteristics of the nuclear power plant, sufficient power may be supplied with only electric power produced by the Sterling engine 140. Besides, since the emergency DC battery capacity of a passive nuclear power plant is not greater than the emergency power required by an active nuclear power plant, the DC battery may be recharged by power produced by the operation of the Sterling engine 140.

The reactor cooling and power generation system 100 may be formed to have a seismic design of seismic category I to III specified by ASME (American Society of Mechanical Engineers). Specifically, seismic category I is applied to structures, systems and components classified as safety items, and should be designed to maintain an inherent "safety function" in case of a safe shutdown earthquake (SSE), and the safety function is maintained even under the operating basis earthquake (OBE) in synchronization with a normal operation load, and the appropriate allowable stresses and changes are designed to be within limits.

Though not requiring nuclear safety or continuous functions, seismic category II is applied to an item in which structural damages or interactions of the items may reduce the safety functions of seismic category I structures, systems and components or result in damage to the operator. In detail, seismic category II structures, systems and components are not required to have functional integrity for a safety shutdown earthquake, but required only to have structural integrity. In addition, seismic category II structures, systems and components should be designed and arranged so as not to impair the safety-related operation of seismic category I items.

Seismic category III is designed according to uniform building codes (UBCs) or general industrial standards according to the individual design function.

The reactor cooling and power generation system 100 may be configured to have a safety rating of safety ratings 1 to 3 of the reactor plant specified by the American Society of Mechanical Engineers (ASME). In detail, the safety class of a nuclear power plant is largely divided into safety class 1 through safety class 3.

Safety class 1 is a class assigned to a RCS (reactor coolant system) pressure-boundary portion of a facility and its support that constitute a reactor coolant pressure boundary (a portion that may result in a loss of coolant beyond a normal make-up capacity of the reactor coolant in the event of a failure).

Safety class 2 may be assigned to a pressure-boundary portion of the reactor containment building and its support, and assigned only to a pressure-resistant portion of a facility and its support that perform the following safety functions while not belonging to safety class 1.

- A function of preventing the release of fission products or detaining or isolating radioactive materials in the containment building
- A function of removing heat or radioactive materials generated in the containment building (e.g., containment building spray system), a function of increasing a negative reactivity to make the reactor in a subcritical state in case of an emergency or suppressing an increase of positive reactivity through a pressure boundary facility (e.g., boric acid injection system)
- A function of supplying coolant directly to the core during an emergency to ensure core cooling (e.g., residual heat removal, emergency core cooling system) and a function of supplying or maintaining sufficient reactor coolant for cooling the reactor core during an emergency (e.g., refueling water storage tank)

Safety class 3 is not included in safety classes 1 and 2, and may be assigned to a facility that performs one of the following safety functions:

- A function of controlling the concentration of hydrogen in the reactor containment building within the allowable limit
- A function of removing radioactive materials from a stable space outside the reactor containment building (e.g., reactor control room, nuclear fuel building) with safety class 1, 2 or 3 facilities
- A function of increasing a negative reactivity to make or maintain the reactor in a subcritical state (e.g., boric acid make-up)
- A function of supplying or maintaining sufficient reactor coolant for core cooling (e.g., Reactor coolant replenishment system)
- A function of maintaining a geometric structure inside the reactor to ensure core reactivity control or core cooling capability (e.g., core support structure)
- A function of supporting or protecting the load for safety class 1, 2 or 3 facilities (concrete steel structures not included in KEPIC-MN, ASME sec. III).
- A function of shielding radiation for people outside the reactor control room or nuclear power plant
- A cooling maintenance function of spent wet storage fuel (e.g., spent fuel vault and cooling system)
- A function of ensuring safety functions performed by safety class 1, 2 or 3 facilities (e.g., a function of removing heat from safety class 1, 2 or 3 heat exchangers, a safety class 2 or 3 pump lubrication function, a fuel feeding function of emergency diesel engine)
- A function of supplying activation electric power or motive power to safety class 1, 2 or 3 facilities
- A function of allowing safety class 1, 2 or 3 facilities to provide information for manual or automatic operation required for the performance of safety functions or controlling the facilities
- A function of allowing safety class 1, 2 or 3 facilities to supply power or transmit signals required the performance of safety functions
- Manual or automatic interlocking function to ensure or maintain safety class 1, 2 or 3 facilities to perform appropriate safety functions
- A function of providing appropriate environmental conditions for safety class 1, 2 or 3 facilities and an operator
- A function corresponding to safety class 2 to which standards for the design and manufacture of pressure vessels, KEPIC-MN, ASME Sec. III, are not applied On the other hand, a fluid discharged through heat exchange with the high temperature section 141 is transferred to the condensate storage section 150 along the pipe 139. In detail, the condensate storage section 150 may be disposed at a lower portion of the electric power production section 130 to collect condensate being condensed and discharged while exchanging heat with the fluid of the high temperature section 141. However, in an embodiment of the present disclosure, it may be constructed such that the condensate generated in the high temperature section 141 is transferred to the condensate storage section 150 by gravity. However, it may also be constructed such that a pump (not shown) is installed between the pipe 139 and the condensate storage section 150 according to the characteristics of the nuclear power plant to forcibly transfer the condensate.

The condensate collected in the condensate storage section 150 may be circulated through the heat exchange section 120 and the electric power production section 130. Moreover, the condensate storage section 150 may be connected to the heat exchange section 120 and the pipe 156 to supply the condensate to the heat exchange section 120.

The condensate may be supplied to the pipe 156 through the pipes 159 and 151 connected to the condensate storage section 150. Specifically, the condensate in the condensate storage section 150 may be supplied to the pipe 156 connected to the heat exchange section 120 through the valve 154 and the check valve 155 by the motor 152 and the small pump 153 connected to the pipe 151. Furthermore, the condensate may be supplied to the pipe 156 connected to the heat exchange section 120 by gravity through the valve 157 and the check valve 158 connected to the pipe 159 of the condensate storage section 150.

The motor 152 may be supplied with electric power produced by the power production section 130 itself through a connected line 138. In addition, the motor 152 may be provided to charge electric power produced by the power production section 130 to the emergency battery 163, and receive electric power from the emergency battery 163.

On the other hand, in another embodiment, a fluid exchanging heat with the high temperature section 141 through the pipe 124 may be driven by a single-phase fluid that does not undergo phase change due to heat discharged from the core 114. When the single-phase fluid circulating through the heat exchange section 120 and the electric power production section 130 is a gas, the gaseous fluid may be circulated without having the above-mentioned condensate storage section. Moreover, when the single-phase fluid is a liquid, the liquid may be circulated through the heat exchange section 120 and the electric power production section 130 without having the condensate storage section described above with the aid of a pressurizer and a pressure control section.

The power system 160 may be formed to use the power produced during the foregoing normal operation of the nuclear power plant as the power of the internal and external power (electric power) system 161. In detail, the internal and external electric power system 161 may be a system for processing electricity supplied from an on-site large turbine generator, a power production section 130, an on-site diesel generator, and an external electric power grid.

In addition, electric energy may be stored in the emergency battery 163 through a charger 162, which is a facility for storing alternating current (AC) electricity supplied from the on-site, the outside, or the power production section 130 or the like. The emergency battery 163 may be a battery provided in a nuclear power plant on-site to supply emergency DC power used during an accident.

Further, the electric energy stored in the emergency battery 163 may be supplied to the emergency power consuming component 164 and used as an emergency power source. The emergency power source may be used as a power source for operating the nuclear power plant safety system or opening or closing a valve for the operation of the nuclear power plant safety system or monitoring the nuclear safety system during an accident of the nuclear power plant. Moreover, the electric power produced by the power production section 130 during an accident of the nuclear power plant may also be formed to be supplied to the emergency power source of the nuclear power plant.

Moreover, when the heat exchange section 120 and the power production section 130 fail due to the occurrence of a severe accident, a flow path through the IRWST 170 and the first discharge section 175 is already formed, and therefore, it may be formed to efficiently supply and discharge a flow rate of cooling water by a simple operation such as opening or closing a valve according to an operator action to cool the reactor vessel 110.

Figure 1B:
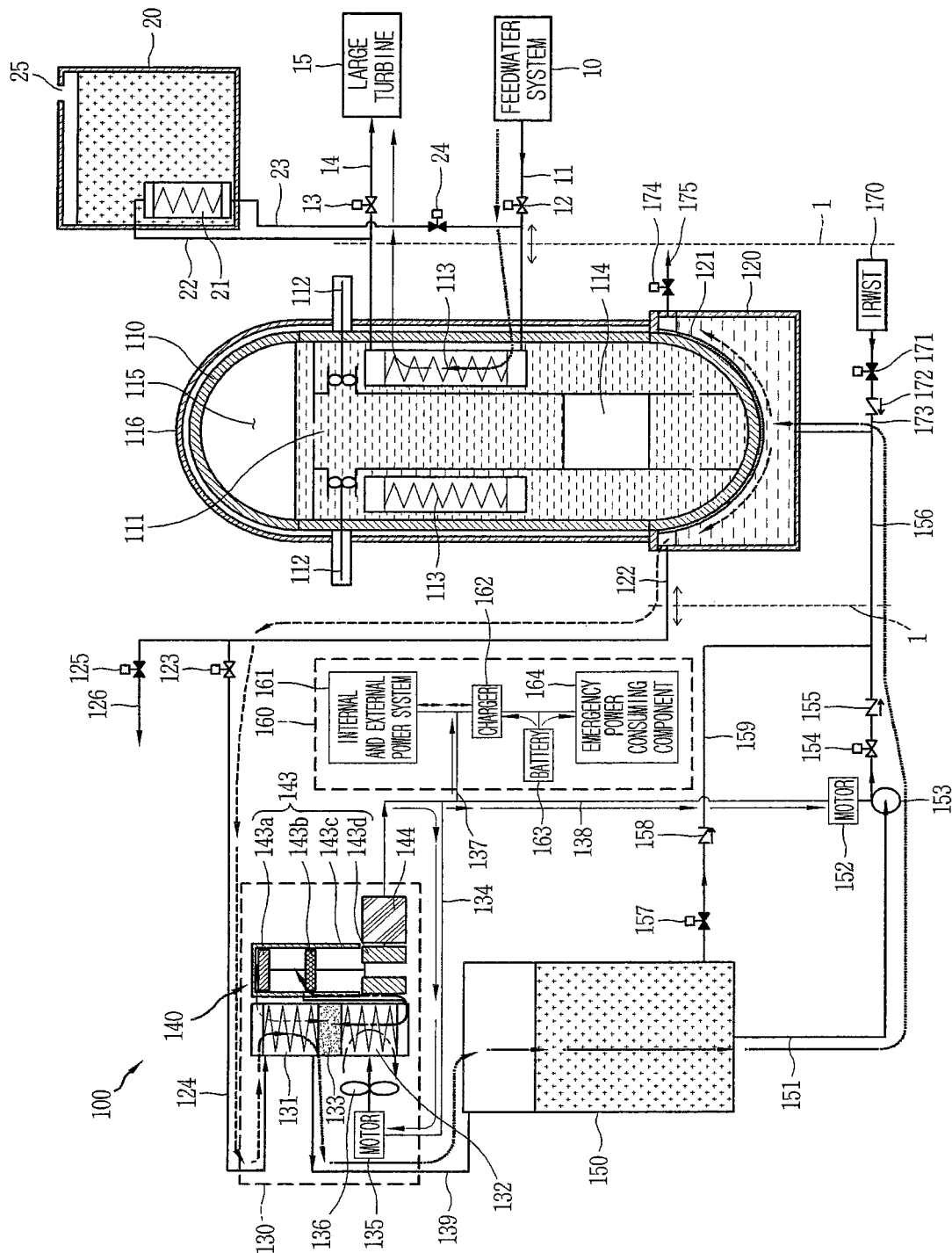
FIG. 1B is a conceptual view illustrating the operation of reactor cooling and power generation system during a normal operation associated with an embodiment of the present disclosure.

FIG. 1B is a conceptual view illustrating the operation of the reactor cooling and power generation system 100 during a normal operation of the nuclear power plant associated with an embodiment of the present disclosure.

Referring to FIG. 1B, it is a conceptual view illustrating system arrangement and supercritical fluid flow during a normal operation of the nuclear power plant. Main feedwater (water) is supplied from the feedwater system 10 to the steam generator 113, and heat received from the core 114 by the reactor coolant circulation of the reactor coolant system 111 is transferred the secondary system through the steam generator 113 to increase the temperature of the main feedwater and produce steam. The steam produced from the steam generator 113 is supplied to the large turbine 15 along the main steam line 14 to rotate the large turbine 150 and rotate the large generator (not shown) connected through the shaft to produce electric power. The power produced through the large generator may supply electricity to an on-site or off-site from the power system.

Meanwhile, feedwater supplied from the small pump 153 to the heat exchange section 120 through the pipe 156 may receive heat while moving upward along the outer wall of the reactor vessel 110 to produce steam. The steam may be supplied to the electric power production section 130 including the Stirling engine 140 along the discharge pipe 122 disposed at an upper portion of the heat exchange section 120, and the thermal energy of the steam may be converted into mechanical energy while operating the Sterling engine 140, and the mechanical energy may be converted into electrical energy by the electricity generation section 144 connected to the shaft to produce electric power.

Further, electric power produced by the power production section 130 may be formed to use the electric power as the electric power of the internal and external power (electric power) system 161 through the power system 160. In addition, electric energy may be stored in the emergency battery 163 through a charger 162, which is a facility for storing alternating current (AC) electricity supplied from the on-site, the outside, or the power production section 130 or the like as emergency power. The emergency battery 163 may be a battery provided in the on-site to supply emergency DC power used during an accident. Further, the electric power may be supplied to the emergency power consuming component 164 and used as an emergency power source.

In addition, a fluid discharged while exchanging heat with the high temperature section 141 of the Stirling engine 140 may be heat-exchanged with the high temperature section 141 and condensed to discharge condensate, and the condensate may be collected in the condensate storage section 150 along the pipe 139. The condensate collected in the condensate storage section 150 may be circulated through the heat exchange section 120 and the electric power production section 130. Moreover, the condensate storage section 150 may be connected to the heat exchange section 120 and the pipe 156 to supply the condensate to the heat exchange section 120.

As described above, during a normal operation of the nuclear power plant, the reactor cooling and power generation system 100 may be operated simultaneously with the nuclear power generation facility.

Figure 1C:
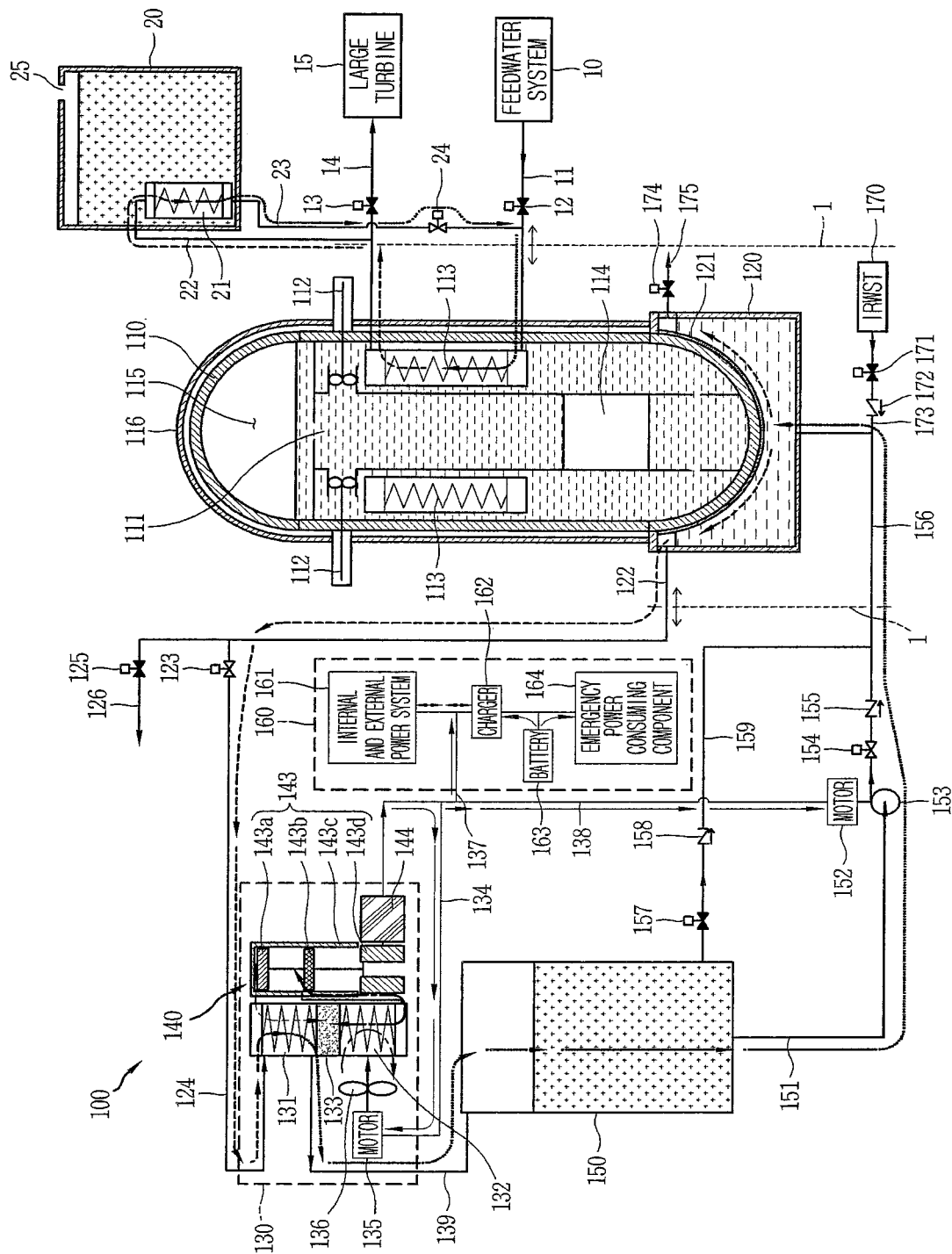
FIG. 1D is a conceptual view illustrating a natural circulation operation of a reactor cooling and power generation system during a nuclear design basis accident associated with an embodiment of the present disclosure.
FIG. 1E is a conceptual view illustrating the operation of a reactor cooling and power generation system during a serious nuclear power plant accident associated with an embodiment of the present disclosure.

FIG. 1C is a conceptual view illustrating a forced circulation operation of the reactor cooling and power generation system 100 during a nuclear design basis accident associated with an embodiment of the present disclosure.

Referring to FIG. 1C, it is illustrated a conceptual view of the operation of the reactor cooling and power generation system 100 when the operation of the small pump 153 and the electric power production section 130 is enabled during a nuclear design basis accident.

Specifically, when an accident occurs in a nuclear power plant due to various causes, safety systems such as a passive residual heat removal system, a passive safety injection system and a passive containment cooling system, including the emergency cooling water storage section 20, which are installed in a plurality of trains, may operate automatically. Further, steam generated by the operation of the safety system may be discharged from the steam discharge section 25 of the emergency cooling water storage section 20.

The operation of the safety system may remove residual heat generated in the reactor coolant system 111 and the core 114. In addition, safety injection water is supplied to the reactor coolant system 111 to reduce the pressure and temperature of the reactor coolant system 111, reduce the temperature of the core 114, and suppress a pressure increase inside the reactor containment (not shown) by the operation of the passive containment cooling system to protect the reactor containment.

On the other hand, while the isolation valves 12, 13 provided in the main feedwater line 11 and the main steam line 14 are closed, the operation of the large turbine 15 is stopped. However, even when the reactor core 114 is stopped, residual heat is generated in the core 114 for a considerable period of time, and there is a lot of sensible heat in the reactor coolant system 111 and the reactor vessel 110, and thus the temperature of the reactor coolant system 111 and the reactor vessel 110 does not decrease rapidly.

In other words, during a nuclear design basis accident, the nuclear power generation facility is stopped, but the reactor cooling and power generation system 100 continues to operate. Accordingly, emergency power supply and residual heat removal may be efficiently carried out.

Accordingly, even when an accident occurs, the heat exchange section 120 and the power production section 130 may be operated in a substantially similar state as normal operation. Therefore, the power production section 130 may cool the reactor vessel 110 while continuously producing electric power. Over time, the temperature of the reactor vessel 110 may decrease as the residual heat generated in the core 114 decreases. In this case, the reactor cooling and power generation system 100 may be operated in a substantially similar manner as normal operation while reducing the power production amount generated by the power production section 130 in accordance with the reduction in the amount of heat transferred.

Figure 1D:
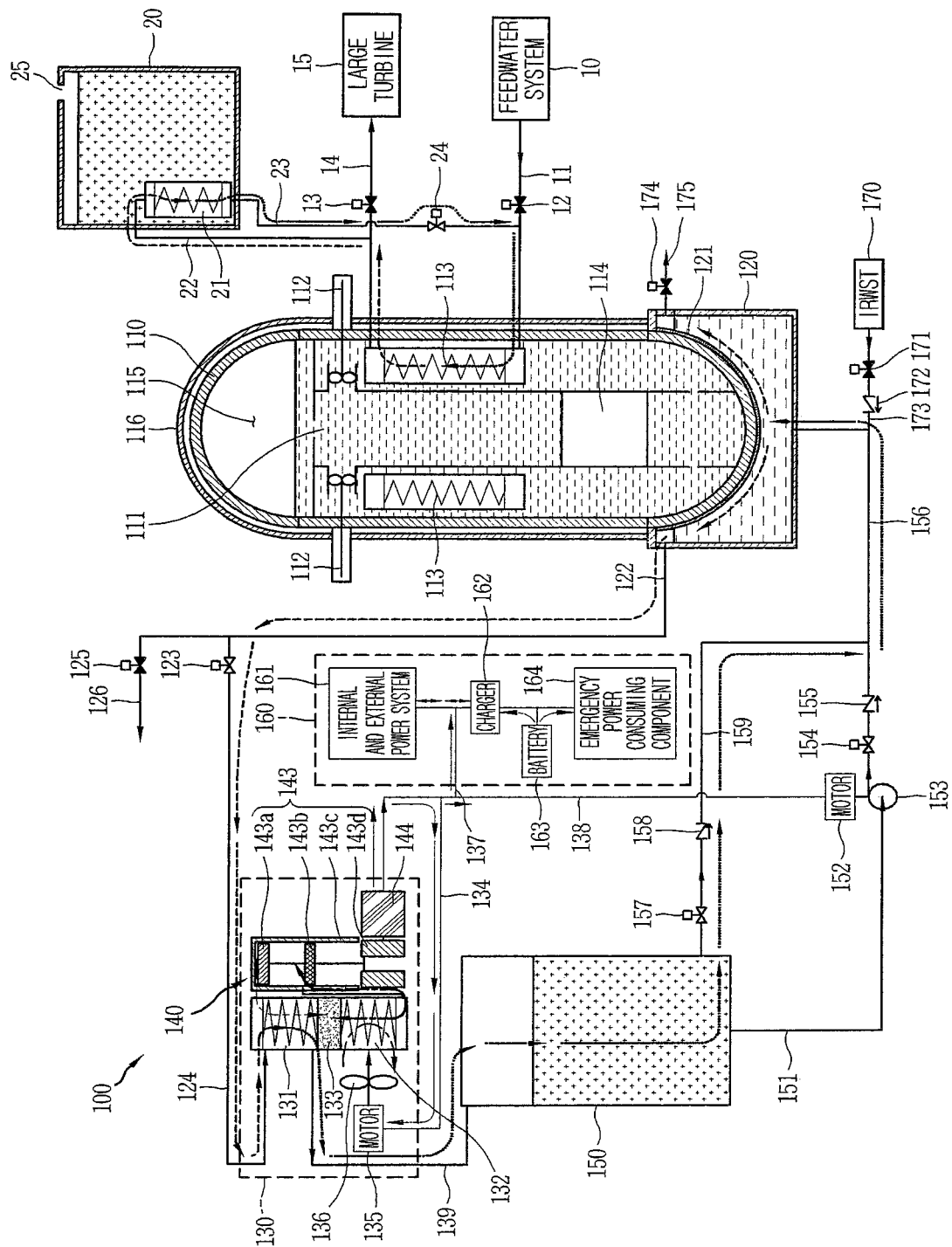

FIG. 1D is a conceptual view illustrating a natural circulation operation of the reactor cooling and power generation system 100 during a nuclear design basis accident associated with an embodiment of the present disclosure.

Referring to FIG. 1D, it is a conceptual view in which the operation of the small pump 153 is disabled due to a natural circulation operation during a design basis accident of the reactor cooling and power generation system 100. A safety system such as a passive residual heat removal system, a passive safety injection system, and a passive containment cooling system including the emergency cooling water storage section 20 installed in a plurality of trains by the related signals may be automatically operated as in the foregoing case of FIG. 10. Accordingly, the reactor coolant system 111 is cooled, and the residual heat of the core 114 is removed, and safety injection water is supplied to the reactor coolant system 111 to reduce the pressure and temperature of the reactor coolant system 111, reduce the temperature of the core 114, and suppress a pressure increase inside the reactor containment (not shown) to protect the reactor containment. On the other hand, while the isolation valves 12, 13 provided in the main feedwater line 11 and the main steam line 14 are closed, the operation of the large turbine 15 is stopped.

In detail, when supply of feedwater from the small pump 153 is stopped for various reasons, the valve 157 and the check valve 158 connected to the condensate storage section 150 may be opened by the related signal or the operator's action, 159 to supply feedwater from the condensate storage section 150 through the pipe 159, and at this time, the feedwater may be supplied by natural circulation due to gravity.

In other words, gravity acts on the condensate in the condensate storage section 150 to supply the condensate by natural circulation. Accordingly, the actuation state of the heat exchange section 120 and the electric power production section 130 may be operated in a state similar to that in the normal operation except for the small pump 153. When the residual heat of the core 114 gradually decreases to reduce a steam production amount over time, the heat exchange section 120 and the electric power production section 130 may be operated similarly to the normal operation while reducing a power production amount of the electric power production section 130.

Figure 1E:
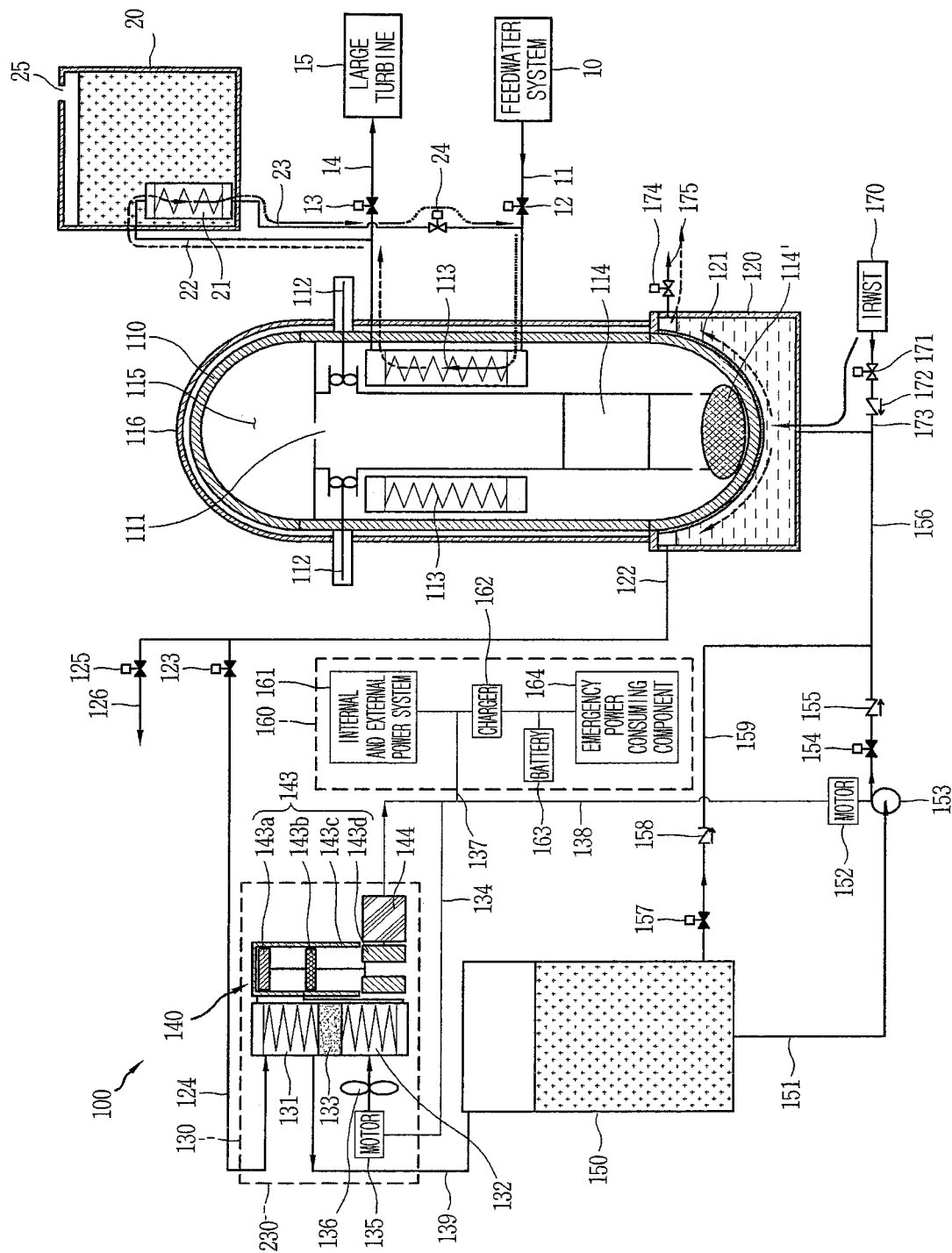

FIG. 1E is a conceptual view illustrating the operation of the reactor cooling and power generation system 100 during a severe accident of the nuclear power plant associated with an embodiment of the present disclosure.

Referring to FIG. 1E, it is a conceptual view in which the operation of the reactor cooling and power generation system 100 is disabled due to a severe accident operation of the reactor cooling and power generation system 100. A safety system such as a passive residual heat removal system, a passive safety injection system, and a passive containment cooling system including the emergency cooling water storage section 20 installed in a plurality of trains by the related signals may be automatically operated as in the foregoing cases of FIGS. 10 and 1D. However, when the probability of occurrence is extremely low, but various safety systems and non-safety systems do not operate, it may occur an accident in which the core temperature rises and the fuel melts.

For example, in order to block the discharge of radioactive materials to the outside of the reactor containment when a severe accident such as the occurrence of the core melt 114' during a nuclear accident, the operation of the heat exchange section 120 and the power production section 130 may be stopped. Accordingly, the pipe 173 connected to the IRWST 170 may be opened by the related signal or the operator's action to receive refueling water from the IRWST 170. As a result, the refueling water may be used to cool the reactor coolant system 111 including a lower portion of the reactor vessel 110 and the reactor vessel 110 and the core melt.

In addition, since a flow path through the IRWST 170 and the second discharge section 175 is already formed, the flow supply and discharge of coolant may be efficiently carried out by a simple operation such as opening and closing the valve or the like according to an operation action on the refueling water received from the IRWST 170. In detail, the second discharge portion 175 may discharge the nuclear refueling water received from the IRWST 170 into the reactor containment (not shown) as a fluid (gas/steam, a mixture of gas steam and liquid/hot water or hot water).

Furthermore, when a severe accident such as damage to the reactor vessel or exposure of the reactor core 114 occurs during a nuclear accident, in addition to the occurrence of the core melt 114' in the reactor, the operation of the heat exchange section 120 and the power production section 130 may be stopped to allow the opening of the valve 174 connected to the first discharge section 175 and the injection of feedwater through the IRWST 170.

Besides, the pipe 173 connected to the IRWST 170 may be constructed to cool the reactor vessel 110 and the reactor coolant system even when cooling and power generation using the heat exchange section 120 and the electric power production section 130 are disabled due to a failure thereof.

Depending on the characteristics of the power plant, a pump (not shown) may be installed in the pipe 173 connected to the IRWST 170 to forcibly inject feedwater or inject feedwater using gravity.

Furthermore, according to another embodiment electric power production section 230 described below, the same or similar reference numerals are designated to the same or similar configurations to the foregoing example, and the description thereof will be substituted by the earlier description.

Figure 2A:
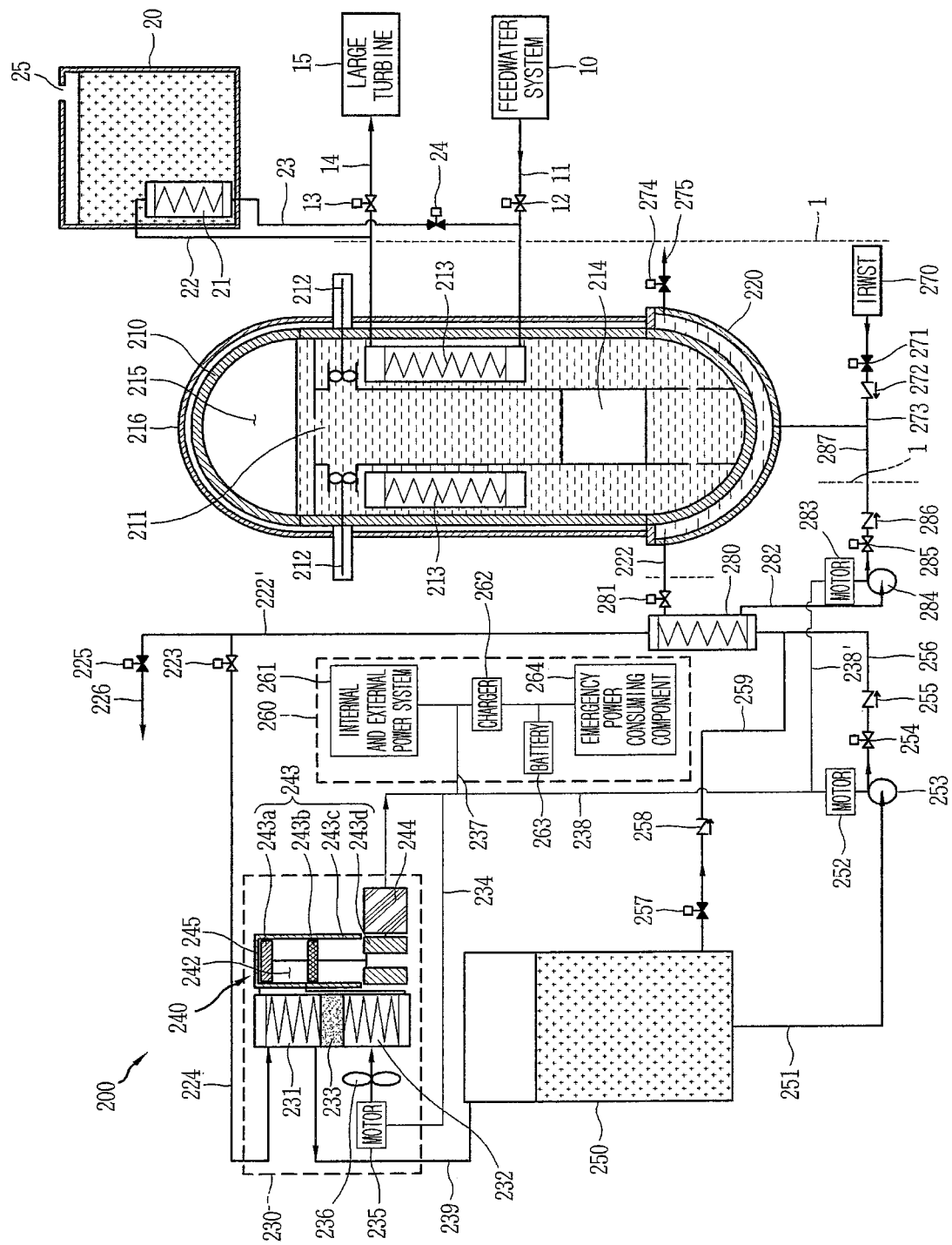
FIG. 2A is a conceptual view of a reactor cooling and power generation system associated with another embodiment of the present disclosure.

FIG. 2A is a conceptual view of a reactor cooling and power generation system 200 associated with another embodiment of the present disclosure.

Referring to FIG. 2A, the reactor cooling and power generation system 200 may further include an evaporator section 280, and the evaporator section 280 may be formed to exchange heat with an internal fluid of the heat exchange section 220 and the condensate of the condensate storage section 250.

In detail, the reactor cooling and power generation system 200 may be formed to have a first circulation section to circulate the heat exchange section 220 and the evaporator section 280. Meanwhile, the reactor cooling and power generation system 200 may be formed to have a second circulation section formed to circulate the evaporator section 280, the electric power production section 230, and the condensate storage section 250.

In other words, the reactor cooling and power generation system 200 may be formed to have a dual circulation loop of the first circulation section and the second circulation section. The evaporator section 280 may be formed to be a boundary between the first circulation section and the second circulation section. The first circulation section may be formed to circulate by a single-phase fluid. In detail, the single-phase fluid of the first circulation section may be a compressed gas (gas).

The fluid circulating through the first circulation section exchanges heat with the evaporator section 280 through the discharge pipe 222 and the valve 281 connected to the heat exchange section 220. The fluid being heat-exchanged in the evaporator section 280 may be supplied to the heat exchange section 220 through a pipe 282, a compressor 284, a valve 285, a check valve 286 and a pipe 287. In detail, the compressor 284 or a blower (not shown) may be formed to perform the circulation of the single-phase fluid of the first circulation section. A motor 283 that operates the compressor 284 may receive electric power by a connected line 238' branched from a connected line 238.

On the other hand, the fluid circulating through the second circulation section may be supplied from a small pump 253 to the evaporator section 280 through a valve 254, a check valve 255 and a pipe 256, and a fluid converted into steam in the evaporator section 280 may be supplied to the electric power production section 230 through the discharge pipe 222' and then cooled and condensed in the first heat exchange section 231 and stored in the condensate storage section 250, and circulated through the pipe 251.

In other words, the fluid circulating through the second circulation section is supplied to the electric power production section 230 including the Stirling engine 240 while circulating the second circulation section described above, so that the thermal energy of the fluid operates the Stirling engine 240 to convert the thermal energy into mechanical energy, and the electricity generation section 244 connected to a shaft may convert the mechanical energy into electric energy to produce electric power. Moreover, electric power produced by the electric power production section 230 may be formed to use the electric power through a power system 260.

Moreover, the heat exchange section 220 capable of cooing the outer wall of the reactor vessel 210 may be formed in a hemispherical shape as illustrated in the drawing, and the heat exchange section 220 may cool the outer wall of the reactor vessel 210 without a coating member or a heat transfer enhancement member.

According to the present embodiment, there is a disadvantage in that the evaporator section 280 is added thereto compared to the embodiment of FIG. 1A, but it has an effect of physically separating a fluid circulating through the first circulation section and the second circulation section, and there is an advantage capable of cooling the reactor vessel 210 using a single-phase fluid.

Figure 2B:
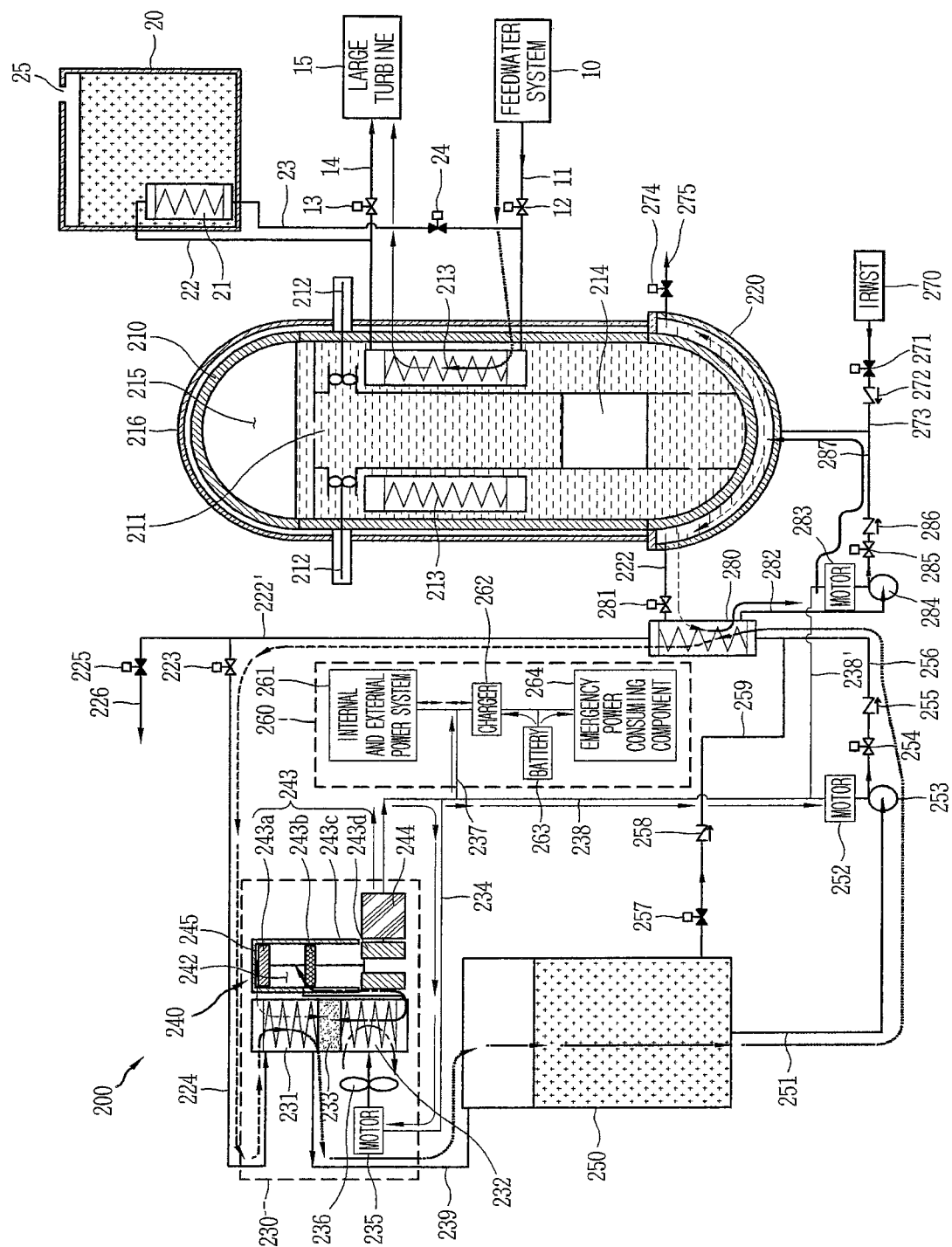
FIG. 2B is a conceptual view illustrating the operation of reactor cooling and power generation system during a nuclear normal operation associated with another embodiment of the present disclosure.

FIG. 2B is a conceptual view illustrating the operation of the reactor cooling and power generation system 200 during a normal operation of the nuclear power plant associated with another embodiment of the present disclosure.

Referring to FIG. 2B, it is a conceptual view illustrating system arrangement and supercritical fluid flow during a normal operation of the nuclear power plant. Main feedwater (water) is supplied from the feedwater system 10 to the steam generator 213, and heat received from the core 214 by the reactor coolant circulation is transferred the secondary system through the steam generator 213 to increase the temperature of the main feedwater and produce steam. The steam produced from the steam generator 213 is supplied to the large turbine 15 along the main steam line 14 to operate the large turbine 150 and rotate the large generator (not shown) connected through the shaft to produce electric power. The power produced through the large generator may supply electricity to an on-site or off-site from the power system.

On the other hand, the single-phase fluid inside the heat exchange section 220 having a shape capable of cooling the outer wall of the reactor vessel 210 is transferred to the evaporator section 280 by receiving the heat of the outer wall of the reactor vessel 210. The cooling and power generation system 200 may be formed to have a first circulation section in which the single-phase fluid transferred to the evaporator section 280 transfers heat to a fluid to be supplied to the electric power production section 230 including the Stirling engine 240, and then circulates through the heat exchange section 220 and the evaporator section 280. Moreover, the compressor 284 and the blower (not shown) connected to the motor 283 may be formed to efficiently perform the circulation of the single-phase fluid circulating through the first circulation section.

On the other hand, the fluid supplied from the small pump 253 to the evaporator section 280 through the valve 254, the check valve 255 and the pipe 256 may be supplied to the electric power production section 230 including the Stirling engine 240 while circulating through the foregoing second circulation section, and the thermal energy of the fluid may be converted into mechanical energy by operating the Stirling engine 240, and the mechanical energy may be converted into electrical energy by the electricity generation section 244 connected to a shaft to produce electric power. Moreover, electric power produced by the electric power production section 230 may be formed to use the electric power through a power system 260.

Figure 2C:
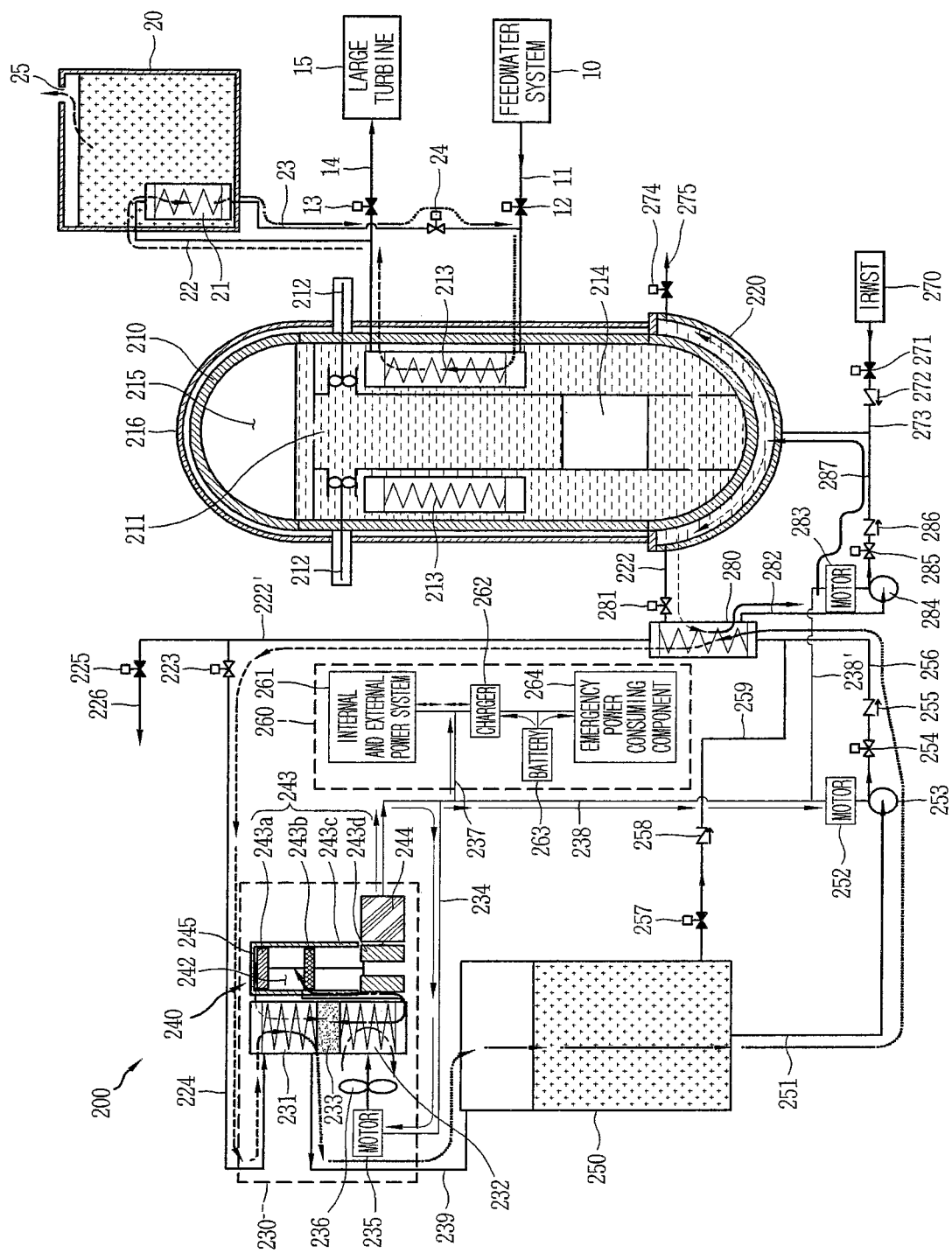
FIG. 2C is a conceptual view illustrating a forced circulation operation of a reactor cooling and power generation system during a nuclear design basis accident associated with an embodiment of the present disclosure.

FIG. 2C is a conceptual view illustrating a forced circulation operation of the reactor cooling and power generation system 200 during a nuclear design basis accident associated with an embodiment of the present disclosure.

Referring to FIG. 2C, it is illustrated a conceptual view of the operation of the reactor cooling and power generation system 200 when the operation of the small pump 253 and the electric power production section 230 is enabled during a nuclear design basis accident.

Specifically, when an accident occurs in a nuclear power plant due to various causes, safety systems such as a passive residual heat removal system, a passive safety injection system and a passive containment cooling system, including the emergency cooling water storage section 20, which are installed in a plurality of trains, may operate automatically. Further, steam generated by the operation of the safety system may be discharged from the steam discharge section 25 of the emergency cooling water storage section 20.

The operation of the safety system may remove residual heat generated in the reactor coolant system and the core 214. In addition, safety injection water is supplied to the reactor coolant system to reduce the pressure and temperature of the reactor coolant system, reduce the temperature of the core 214, and suppress a pressure increase inside the reactor containment (not shown) by the operation of the passive containment cooling system to protect the reactor containment.

On the other hand, while the isolation valves 12, 13 provided in the main feedwater line 11 and the main steam line 14 are closed, the operation of the large turbine 15 is stopped. However, since the temperature of the reactor vessel 210 at an initial stage of the accident is similar, the heat exchange section 220 and the electric power production section 230 respectively connected to the evaporator section 280 may be operated in a substantially similar state as normal operation.

When the temperature of the reactor vessel 210 decreases as residual heat generated in the core 214 decreases and the reactor vessel 210 is cooled by the safety system over time, the electric power production section 230 may be operated similar to normal operation while controlling the power production amount.

Figure 2D:
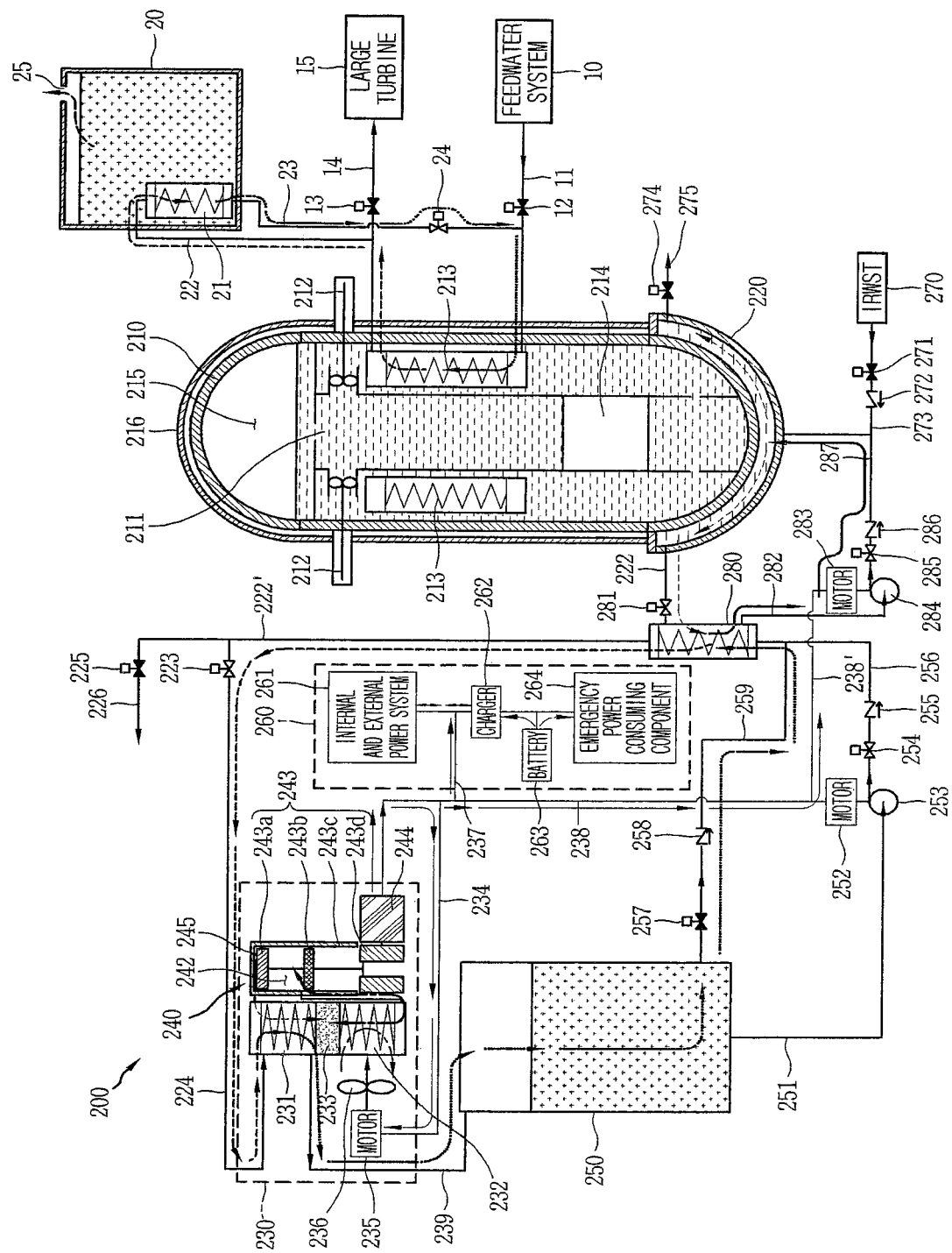
FIG. 2D is a conceptual view illustrating a natural circulation operation of a reactor cooling and power generation system during a nuclear design basis accident associated with an embodiment of the present disclosure.

FIG. 2D is a conceptual view illustrating a natural circulation operation of the reactor cooling and power generation system 200 during a nuclear design basis accident associated with an embodiment of the present disclosure.

Referring to FIG. 2D, it is a conceptual view in which the operation of the small pump 253 is disabled due to a natural circulation operation during a design basis accident of the reactor cooling and power generation system 200. A safety system such as a passive residual heat removal system, a passive safety injection system, and a passive containment cooling system including the emergency cooling water storage section 20 installed in a plurality of trains by the related signals may be automatically operated as in the foregoing case of FIG. 2C. Accordingly, the reactor coolant system 211 is cooled, and the residual heat of the core 214 is removed, and safety injection water is supplied to the reactor coolant system 211 to reduce the pressure and temperature of the reactor coolant system 211, reduce the temperature of the core 214, and suppress a pressure increase inside the reactor containment (not shown) to protect the reactor containment. On the other hand, while the isolation valves 12, 13 provided in the main feedwater line 11 and the main steam line 14 are closed, the operation of the large turbine 15 is stopped.

In detail, when supply of feedwater from the small pump 253 is stopped for various reasons, the valve 257 and the check valve 258 connected to the condensate storage section 250 may be opened by the related signal or the operator's action, 259 to supply feedwater from the condensate storage section 250 to the evaporator section 280 through the pipe 259, and at this time, the feedwater may be supplied by natural circulation due to gravity.

In other words, gravity acts on the condensate in the condensate storage section 250 to supply the condensate by natural circulation. Accordingly, the actuation state of the heat exchange section 220 and the electric power production section 230 may be operated in a state similar to that in the normal operation except for the small pump 253. When the residual heat of the core 214 gradually decreases to reduce a steam production amount over time, the heat exchange section 120 and the electric power production section 230 may be operated similarly to the normal operation while controlling a power production amount of the electric power production section 130.

Figure 2E:
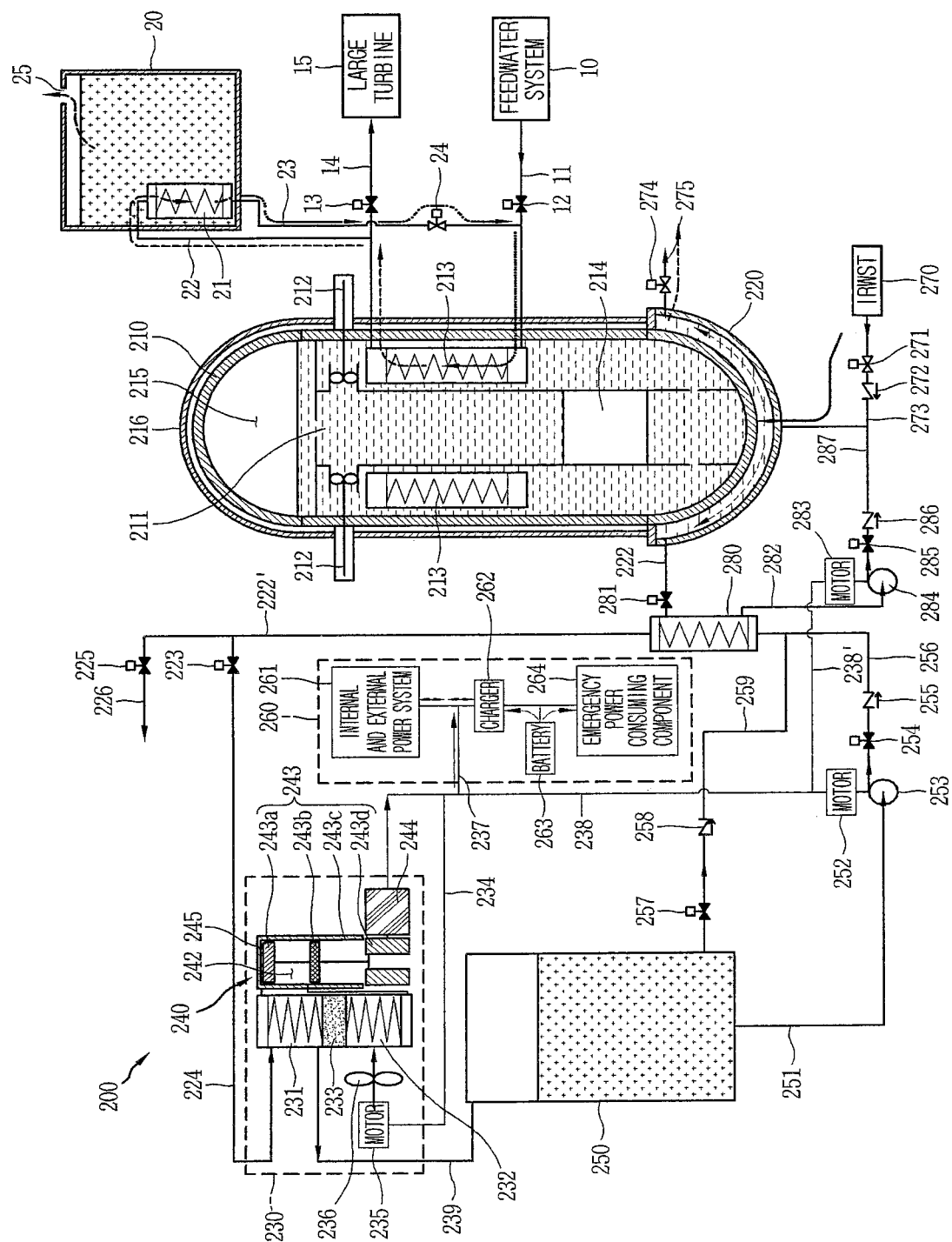
FIG. 2E is a conceptual view illustrating the operation of a reactor cooling and power generation system during a serious nuclear power plant accident associated with an embodiment of the present disclosure.

FIG. 2E is a conceptual view illustrating the operation of the reactor cooling and power generation system 200 during a severe accident of the nuclear power plant associated with an embodiment of the present disclosure.

Referring to FIG. 2E, it is illustrated a conceptual view of the operation of the reactor cooling and power generation system 200 when the operation of the reactor cooling and power generation system 200 is stopped during a severe nuclear accident. A safety system such as a passive residual heat removal system, a passive safety injection system, and a passive containment cooling system including the emergency cooling water storage section 20 installed in a plurality of trains by the related signals may be automatically operated as in the foregoing case of FIG. 2C. However, when the probability of occurrence is extremely low, but various safety systems and non-safety systems do not operate, it may occur an accident in which the core temperature rises and the fuel melts.

For example, when a severe accident such as the occurrence of the core melt 214' during a nuclear accident occurs during a nuclear accident, the operation of the heat exchange section 220 and the electric power production section 230 respectively connected to the evaporator section 280 may be stopped. As a result, the valve 271 and the check valve 272 connected to the IRWST 270 may be opened by the related signal or the operator's action to supply feedwater from the IRWST 270 through the pipe 273 so as to cool a lower portion of the reactor vessel 210, and the valve 274 provided in the second discharge section 275 is opened to discharge the generated steam. Depending on the characteristics of the power plant, a pump (not shown) may be installed in the pipe 273 connected to the IRWST 270 to forcibly inject feedwater or inject feedwater using gravity.

Moreover, even when a severe accident such as damage to the reactor vessel or exposure of the reactor core 214 occurs during a nuclear accident, in addition to the occurrence of the core melt 214' in the reactor, in case where the operation of the heat exchange section 220 and the electric power production section 230 respectively connected to the evaporator section 280 is stopped, the opening of the valve 274 connected to the first discharge section 275 and the injection of feedwater through the IRWST 270 may be allowed from a preventive point of view.

Furthermore, according to still another embodiment electric power production section 230 described below, the same or similar reference numerals are designated to the same or similar configurations to the foregoing example, and the description thereof will be substituted by the earlier description.

FIGS. 3A through 3E are conceptual views of a reactor cooling and power generation system associated with still another embodiment of the present disclosure.

Figure 3A:
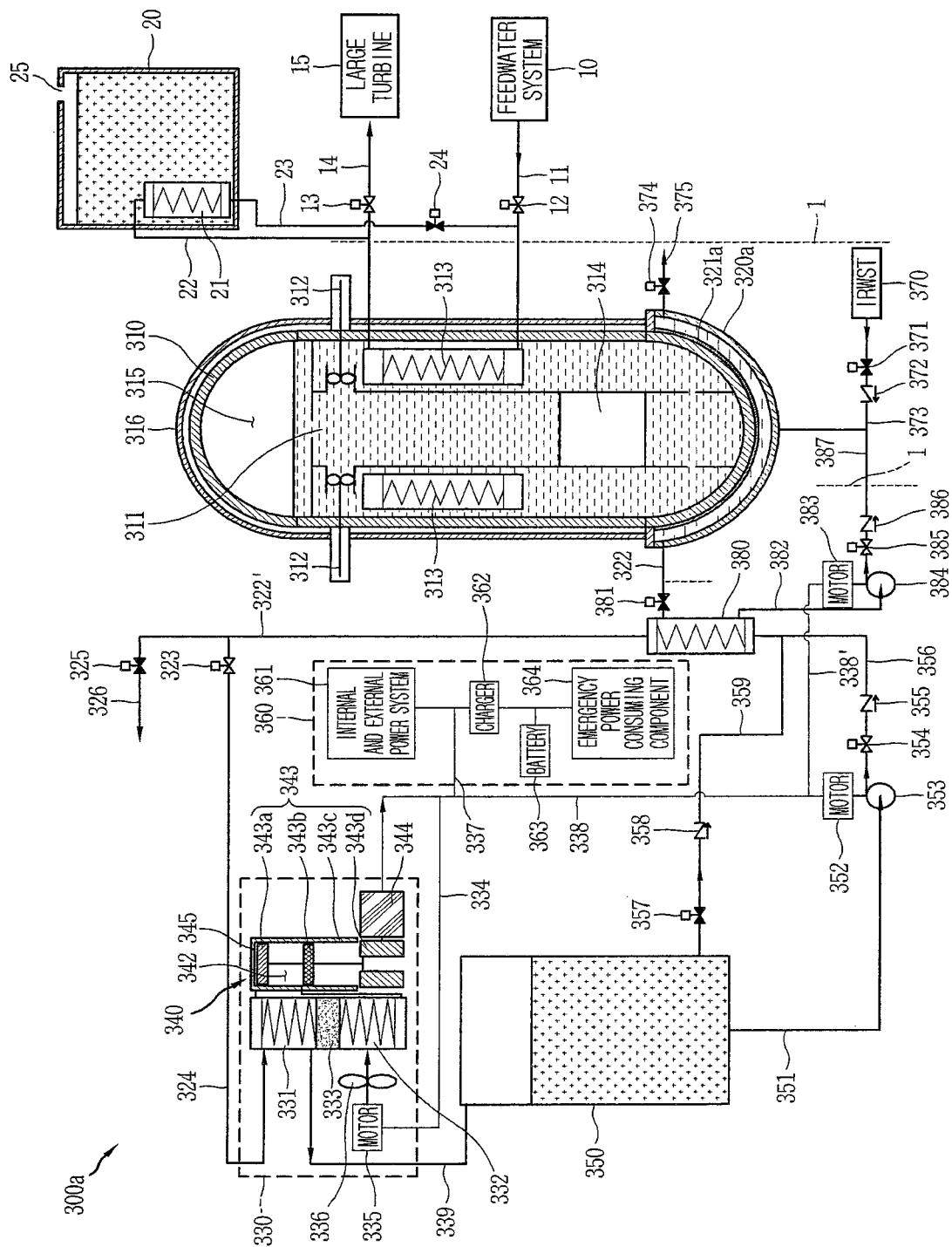
FIGS. 3A through 3E are conceptual views of a reactor cooling and power generation system associated with still another embodiment of the present disclosure.

Referring to FIG. 3A, the shape of the heat exchange section 320a of the reactor cooling and power generation system 300a may be hemispherical. In addition, the heat exchange section 320a having a shape capable of cooling the outer wall of the reactor vessel may further include a coating member 321a for preventing corrosion or increasing heat transfer efficiency. In an embodiment, the surface of the coating member 321a may be reformed in various ways, and may also be processed in an uneven shape (cooling fin) to increase the heat transfer surface area. Moreover, the surface of the coating member 321a may further include a heat transfer member (not shown) that can be chemically treated to increase the surface area so as to improve heat transfer efficiency. In other words, the surface of the coating member 321a and the heat transfer member may be chemically treated to increase the surface area, thereby efficiently performing heat transfer.

Figure 3B:
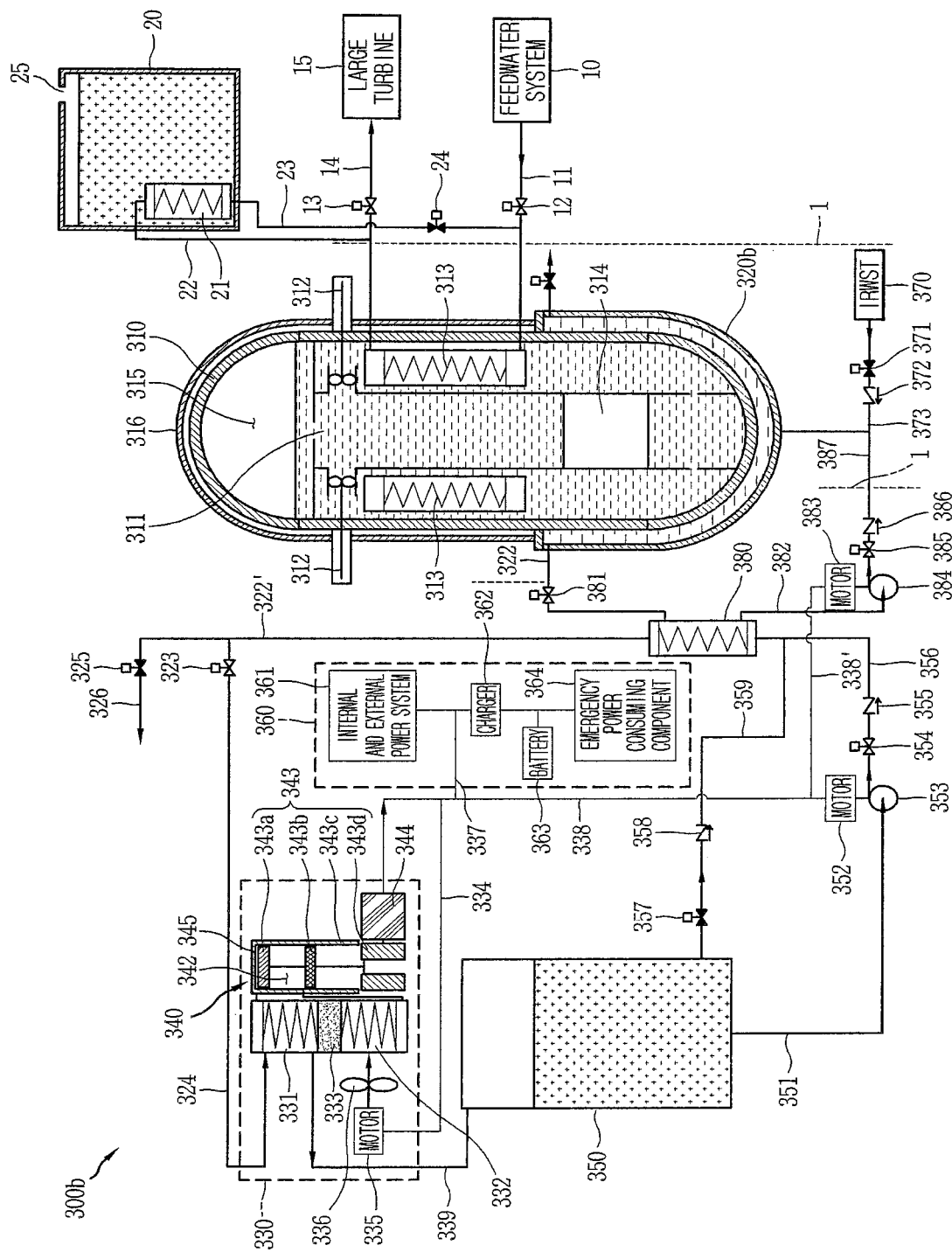

Referring to FIG. 3B, the shape of the heat exchange section 320b of the reactor cooling and power generation system 300b may be a mixture of a hemispherical shape and a cylindrical shape. Various shapes may be employed to increase a heat transfer area of the heat exchange section 320b. Furthermore, the heat exchange section 320b may also cool the outer wall of the reactor vessel 310 without a coating member or a heat transfer enhancement member.

Figure 3C:
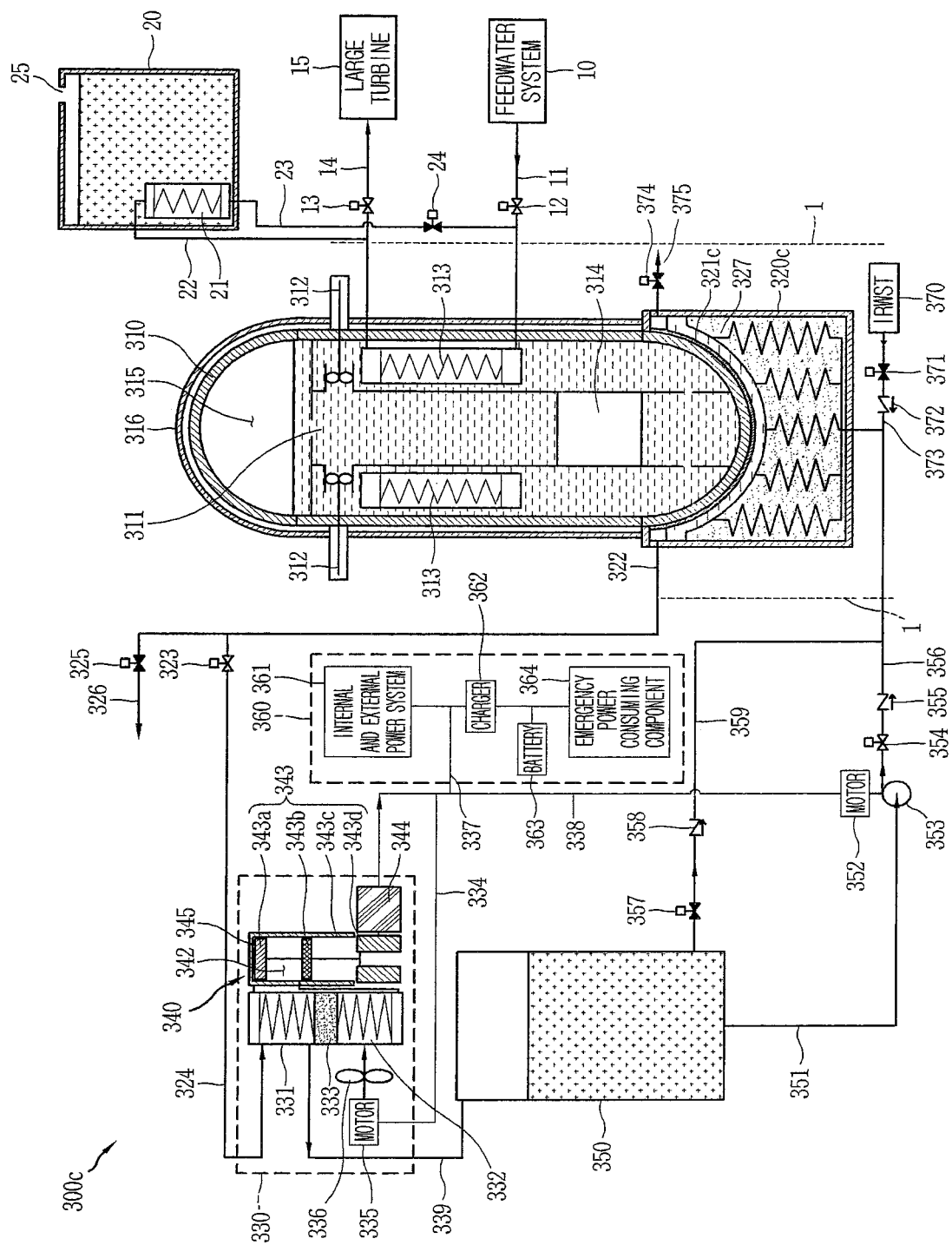

Referring to FIG. 3C, the reactor cooling and power generation system 300c may further include a core catcher 327 inside the heat exchange section 320b having a form capable of cooling the outer wall of the reactor vessel 310, and the core catcher 327 may be formed to receive and cool the melt when the reactor vessel 310 is damaged. In addition, the heat exchange section 320c may further include a coating member 321c for preventing corrosion or increasing heat transfer efficiency.

Figure 3D:
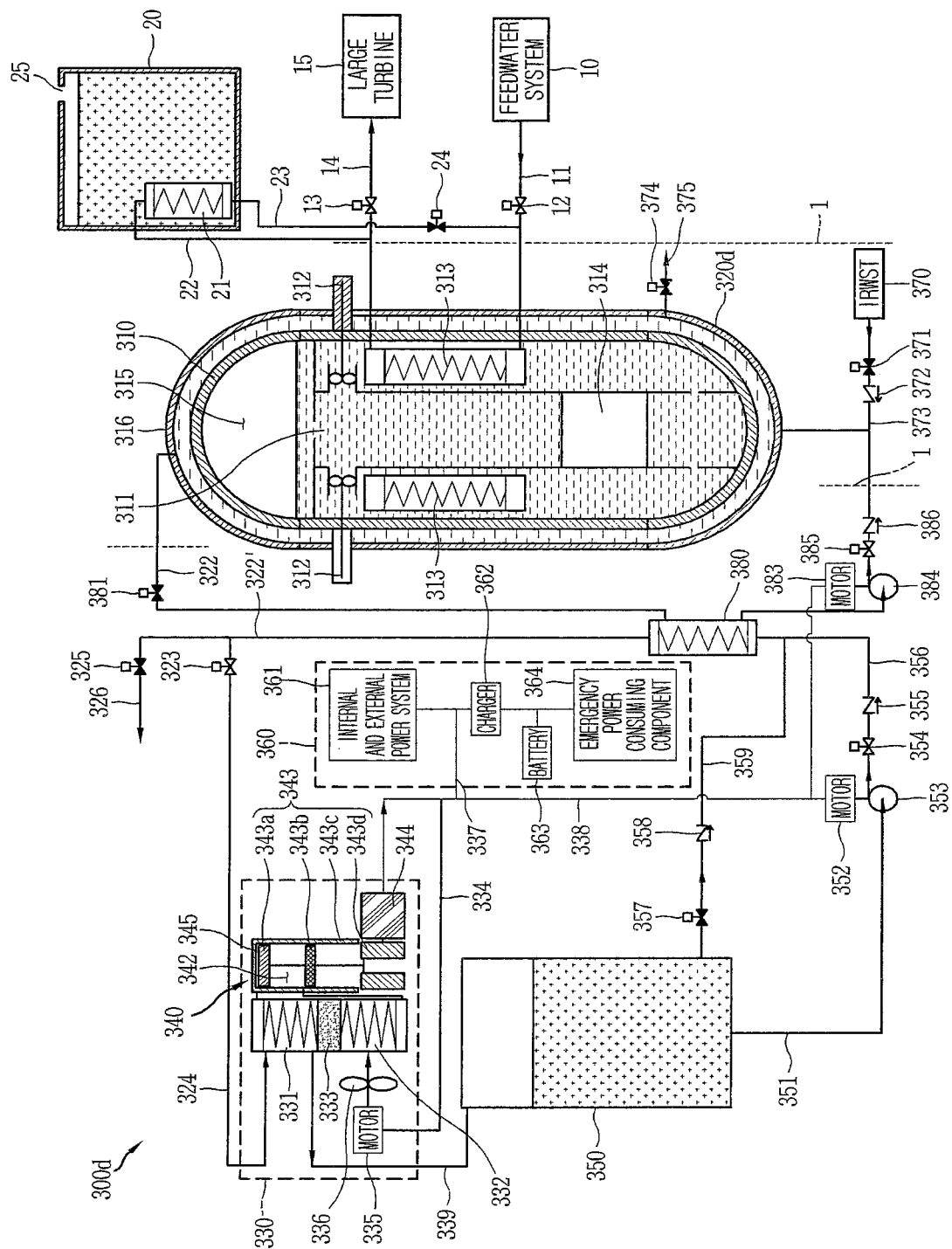

Referring to FIG. 3D, in the reactor cooling and power generation system 300d, a shape of the heat exchange section 320d having a form capable of cooling the outer wall of the reactor vessel may be a shape in which the heat exchange section 320d encloses the entire reactor vessel 310 in a double vessel form. Various shapes may be employed to increase a heat transfer area of the heat exchange section 320d.

In addition, the reactor cooling and power generation system 300d may further include an evaporator section 380 connected to the heat exchange section 320d in a similar manner to the heat exchange section 220 of FIG. 2A described above. The evaporator section 380 may be formed to exchange heat with the internal fluid of the heat exchange section 320d and the condensate of the condensate storage section 350. In other words, the reactor cooling and power generation system 300d may be formed to have a dual circulation loop of the first circulation section and the second circulation section.

Figure 3E:
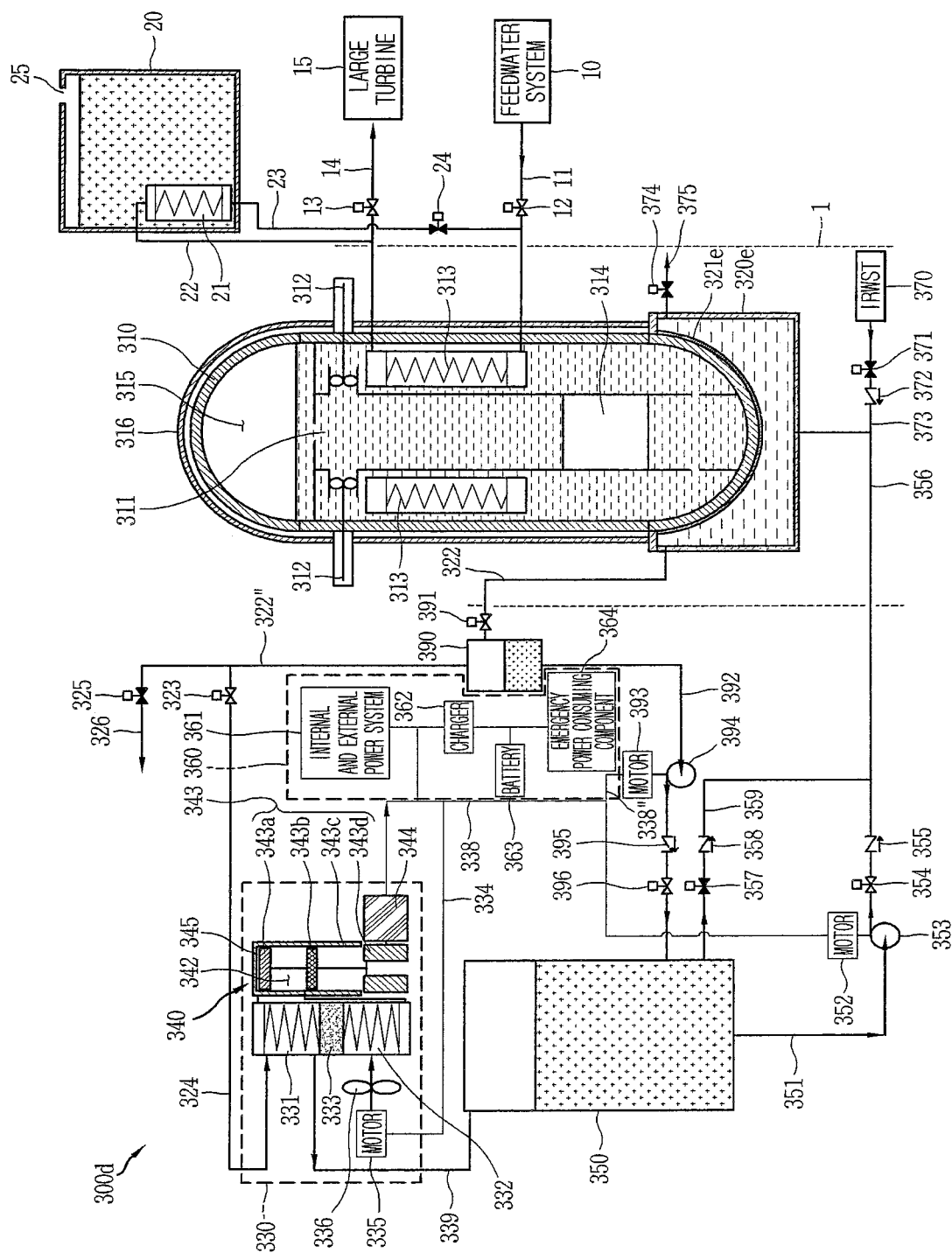

Referring to FIG. 3E, the reactor cooling and power generation system 300e may further include a gas-water separator 390 formed to mount a valve 391 connected to the discharge pipe 322 thereof, and the gas-water separator 390 may be formed to transfer only a gas in a fluid circulating into the heat exchange section 320e to the electric power production section 330 through the discharge pipe 322". Moreover, a coolant return line 392 and a pump 394 may further be formed to return a liquid separated from the gas-water separator 390 to the condensate storage section 350.

A motor 393 that operates the pump 394 may receive electric power by a connected line 338" branched from a connected line 338. A liquid separated from the gas-water separator 390 may be returned to the condensate storage section 350 through the coolant return line 392, the pump 394, the check valve 395 and the valve 396. Specifically, it may be designed and operated at a pressure higher than the vaporization point of liquid to induce single-phase liquid circulation from the pump 394 to the gas-water separator 390, and the liquid and the gas may be separated by the gas-water separator 390.

Figure 4:
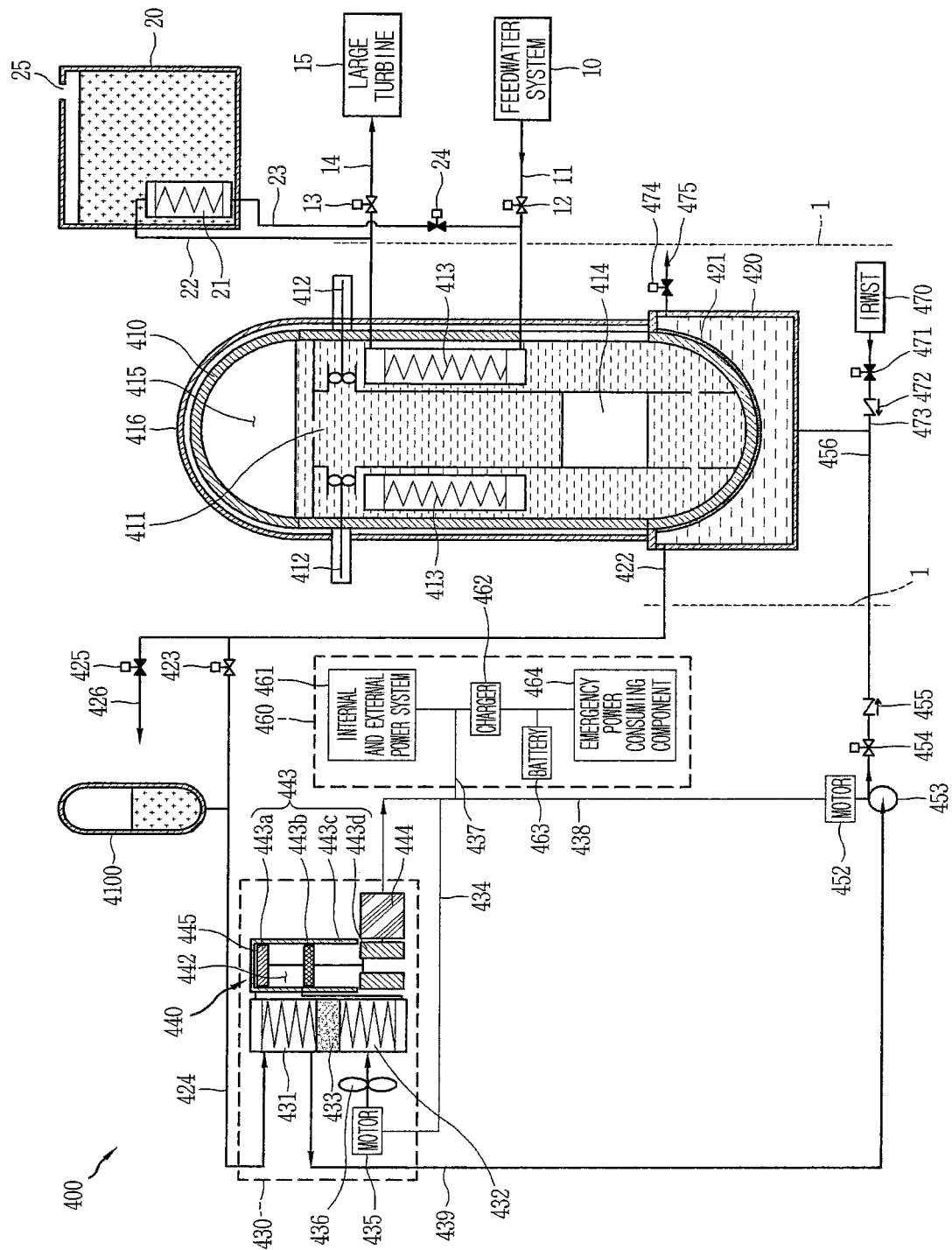
FIG. 4 is a conceptual view of a reactor cooling and power generation system associated with still another embodiment of the present disclosure.

FIG. 4 is a conceptual view of a reactor cooling and power generation system 400 associated with still another embodiment of the present disclosure.

Referring to FIG. 4, the reactor cooling and power generation system 400 may be formed to circulate the internal fluid of the heat exchange section 420 through the electric power production section 430 in a single-phase liquid state.

When the fluid circulating through the reactor cooling and power generation system 400 is a single-phase liquid, a pressure of the circulation loop may be rapidly increased when the volume changes with temperature, and therefore, a pressure control section 4100 may be provided to absorb a change in volume of the single-phase liquid, and control the pressure.

On the other hand, when the fluid circulating through the reactor cooling and power generation system 400 is a single-phase liquid (liquid-phase fluid), the heat transfer efficiency may increase as compared with a case where a high-pressure gas (gas-phase fluid) circulates.

Furthermore, when the pressure control section 4100 is used to pressurize to a predetermined pressure, the requirement of a net positive suction head (NPSH) of the small pump 453 may be relaxed. In addition, when the fluid circulating through the reactor cooling and power generation system 400 is a single-phase liquid, the foregoing condensate storage section and pipes and valves associated with the condensate storage section may be removed to construct the reactor cooling and power generation system 400 in a simplified manner. In other words, the circulation of the fluid in the reactor cooling and power generation system 400 may be simplified, and as the pipe and the circulation loop are simplified, the application of safety grade or seismic design may be facilitated.

Figure 5A:
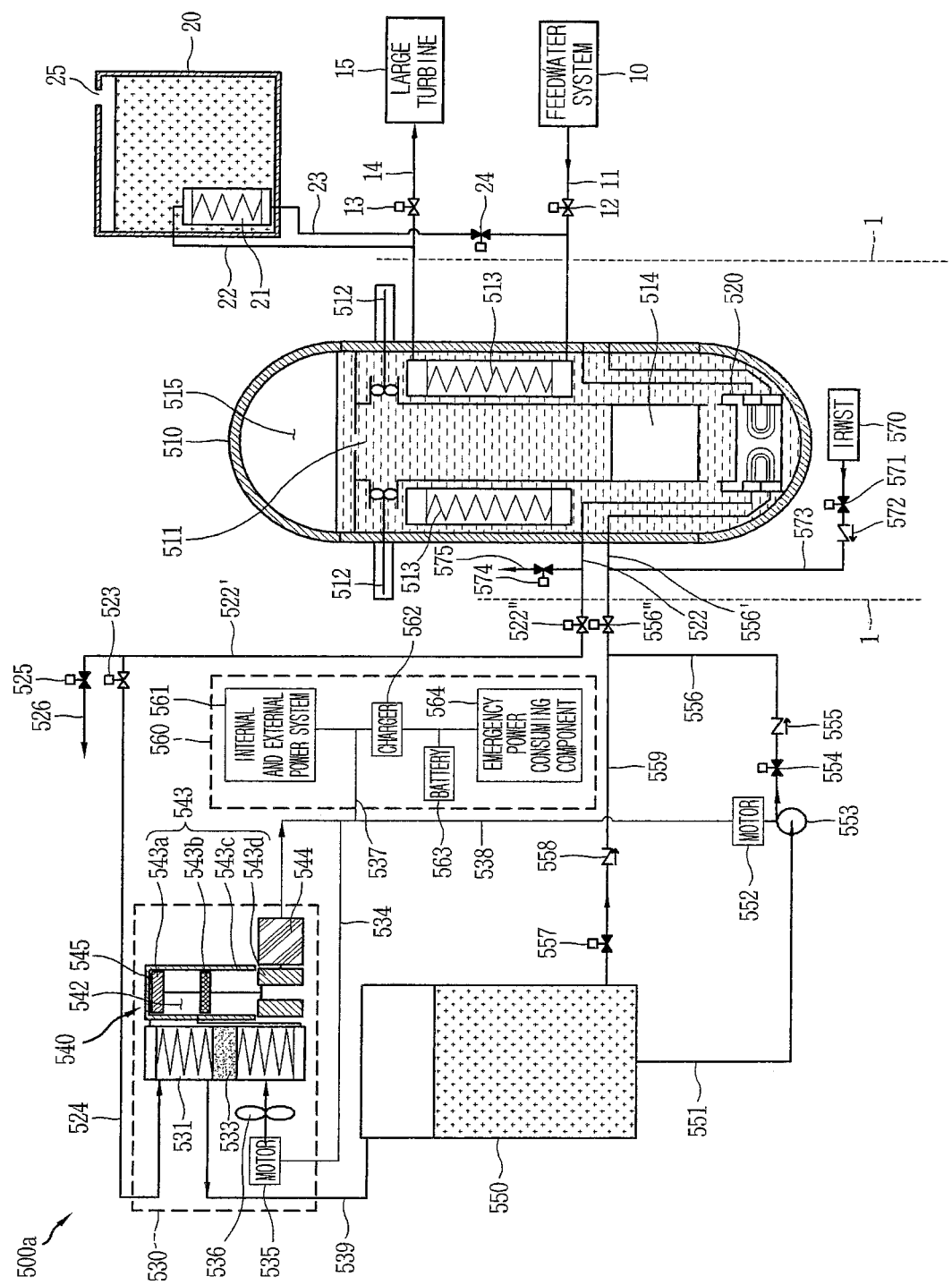
FIGS. 5A through 5C are conceptual views of a reactor cooling and power generation system associated with yet still another embodiment of the present disclosure.
Figure 5B:
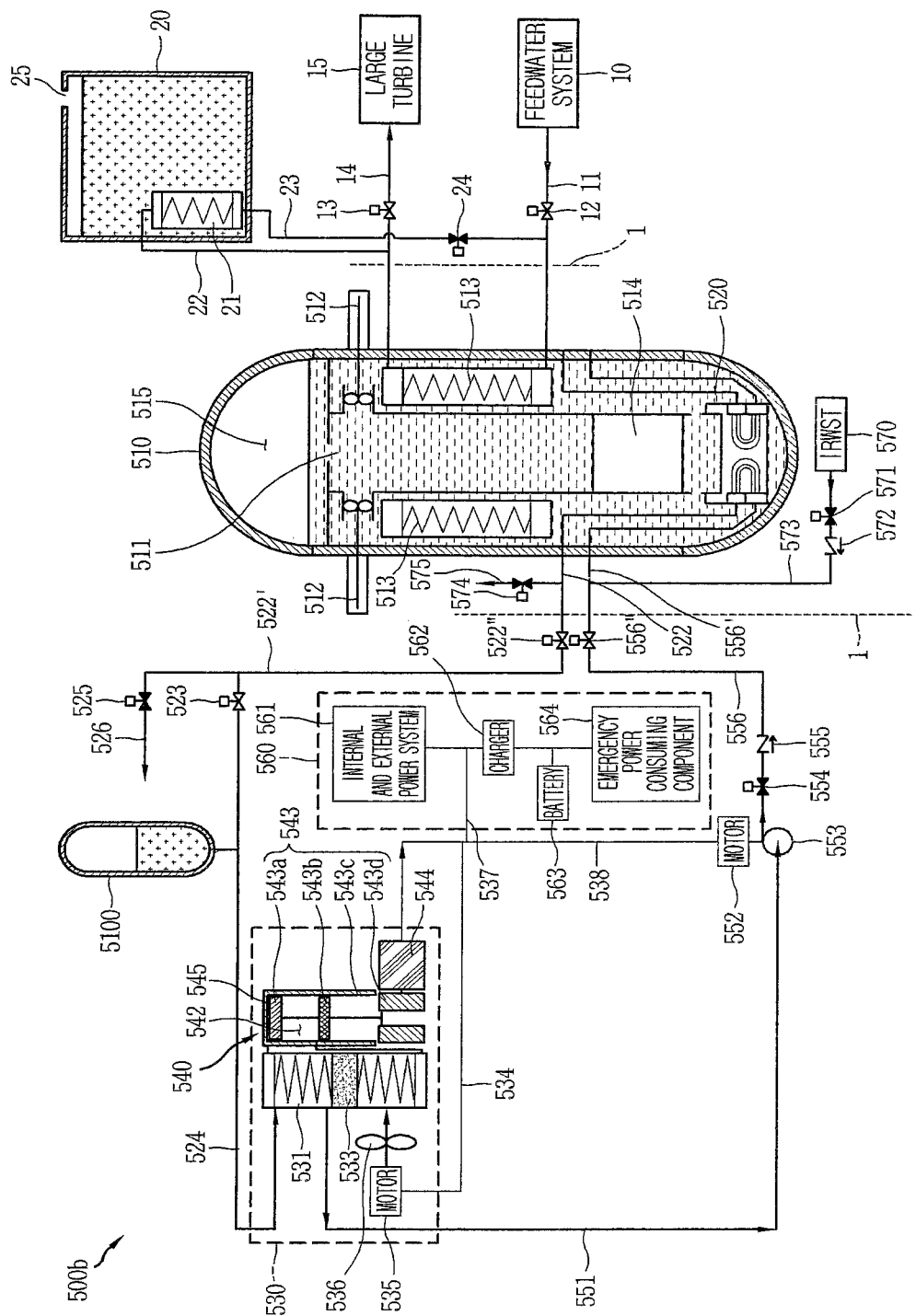
Figure 5C:
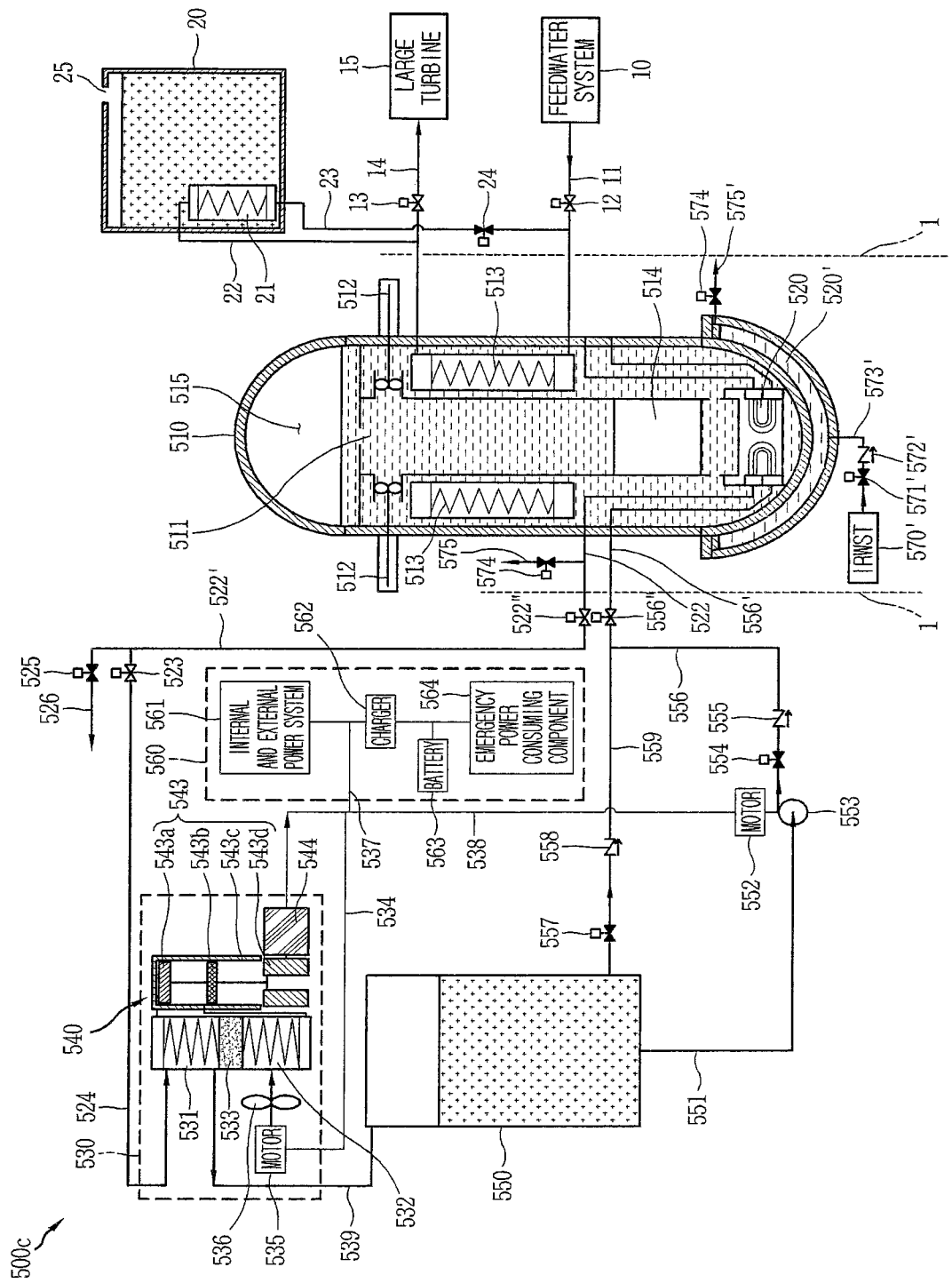

FIGS. 5A through 5C are conceptual views of a reactor cooling and power generation system associated with yet still another embodiment of the present disclosure.

Hereinafter, a reactor cooling and power generation system provided with a heat exchange section 520 inside a reactor vessel to operate even during a normal operation and during an accident of the nuclear reactor so as to generate electric power will be described in more detail with reference to FIGS. 5A through 5C.

Referring to FIG. 5A, the heat exchange section 520 of the reactor cooling and power generation system 500a may be provided inside the reactor vessel 510 to receive heat from the reactor coolant system 511 inside the reactor vessel 510. In detail, the heat exchange section 520 may be formed to circulate a fluid capable of receiving heat from the reactor coolant system 511 to perform cooling in the reactor vessel 510.

In other words, the heat exchange section 520 may perform cooling on reactor coolant inside the reactor vessel 510 during a normal operation of the nuclear power plant. In case of a nuclear accident, cooling on the reactor coolant and the core melt may be carried out.

Referring to the layout of the detailed structures of the heat exchange section 520, the heat exchange section 520 may include an inlet header arranged with inlets into which the fluid is injected, and an outlet header arranged with outlets from which the fluid is discharged, and an inner flow path for exchanging heat with the fluid. Furthermore, a core catcher may be formed as layout of an additional structure of the heat exchange section 520 to receive and cool the melt of the core 514 during a severe accident. The detailed description of the heat exchange section 520 will be described later with reference to FIGS. 6A through 6C and 7A through 7C.

In addition, the fluid in the heat exchange section 520 may pass through the discharge pipe 522, the valve 522" and the discharge pipe 522', and the discharge pipe 522' may be branched to the pipe 524 passing through the valve 523. As a result, the fluid in the heat exchange section may be supplied to the electric power production section 530.

The fluid supplied to the electric power production section 530 may perform power production in the Stirling engine 540 through heat exchange. Moreover the heat-exchanged and discharged fluid is condensed and transferred to the condensate storage section 550 along the pipe 539.

The condensate generated as a condensed fluid collected in the condensate storage section 550 may be circulated through the heat exchange section 520 and the electric power production section 530. Moreover, the condensate storage section 550 may be connected to the heat exchange section 520, the pipes 556, 556' and the valve 556" to supply the condensate to the heat exchange section 520.

Specifically, the condensate in the condensate storage section 550 may be supplied to the pipes 556, 556' connected to the heat exchange section 520 through the valve 554 and the check valve 555 by the motor 552 and the small pump 553 connected to the pipe 551. Furthermore, the condensate may be supplied to the pipe 556' connected to the heat exchange section 520 by gravity through the valve 557 and the check valve 558 connected to the pipe 559 of the condensate storage section 550.

The discharge pipe 522' may further include a first discharge section 526 connected to the valve 525, and the first discharge section 526 may be formed to discharge at least a part of the fluid excessively supplied to the electric power production section 530 or allow it to bypass the electric power production section 530.

Moreover, the heat exchange section 520 may be connected to the IRWST 570 to supply refueling water through the pipe 573. Specifically, the IRWST 570 may be connected to the valve 571 and the check valve 572. As a result, a second discharge section 575 connected to the valve 574 may be provided to discharge the refueling water supplied from the IRWST 570 to the pipe 573 and the pipe 556' through the second discharge section 575 during an accident.

Specifically, the second discharge section 575 is configured to cool the inside of the reactor vessel 510 even when cooling and power generation using the reactor heat exchange section 520 and the power production section 530 is not carried out due to a failure thereof or the like during a severe accident on a pipe for discharging a fluid (gas/steam, a mixture of gas/steam and liquid/hot water or liquid/hot water) from the heat exchange section 520 into the reactor containment (not shown), and the like.

Referring to FIG. 5B, the reactor cooling and power generation system 500b may be formed to circulate the internal fluid of the heat exchange section 520 through the electric power production section 530 in a single-phase liquid state. As a result, similarly to FIG. 4, a pressure control section 5100 may be provided to control the pressure of the single-phase liquid.

In addition, when the fluid circulating through the reactor cooling and power generation system 500b is a single-phase liquid, the foregoing condensate storage section and pipes and valves associated with the condensate storage section may be removed to construct the reactor cooling and power generation system 500b in a simplified manner.

Referring to FIG. 5C, the reactor cooling and power generation system 500c may additionally further include a heat exchange section 520' having a shape capable of cooling the outer wall of the reactor vessel 510. The heat exchange section 520' may be formed to enclose the reactor vessel 510 and receive heat discharged from the reactor vessel 510 so as to cool the outer wall of the reactor vessel 510.

In detail, the shape of the heat exchange section 520' may be hemispherical. However, the shape of the heat exchange section 520' is not limited to a cylindrical shape, and at least a part of the shape of the heat exchange section 520' may include a cylindrical shape, a hemispherical shape, and a double vessel shape or a mixed shape thereof.

In addition, the heat exchange section 520c' may further include a coating member (not shown) for preventing corrosion or increasing heat transfer efficiency. The surface of the coating member may be reformed in various ways, and may also be processed in an uneven shape (cooling fin) to increase the heat transfer surface area. Further, the surface of the coating member may further include a heat transfer member (not shown) that can be chemically treated to increase the surface area so as to improve heat transfer efficiency.

Besides, the heat exchange section 520' may be connected to the IRWST 570' to supply refueling water through the pipe 573'. Specifically, the heat exchange section 520' may be connected to the valve 571' and the check valve 572'. Moreover, when a serious accident occurs, the heat exchange section 520' may further include a discharge section 575' connected to a valve 574' to discharge refueling water supplied through the pipe 573' from the IRWST 570' through a discharge section 575'.

Figure 6A:
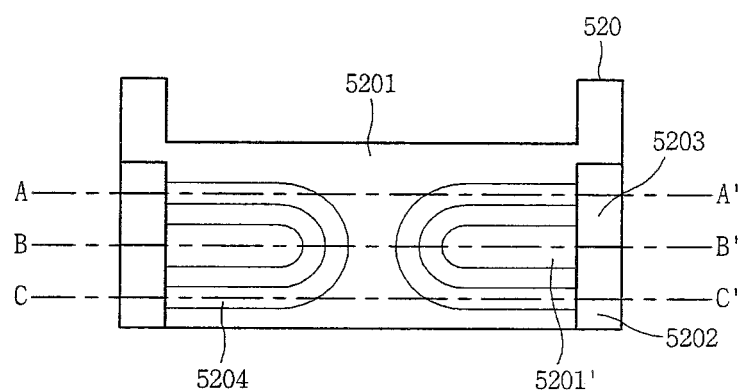
FIGS. 6A through 6C are views for specifically explaining a heat exchange section of FIGS. 5A through 5C.
Figure 6B:
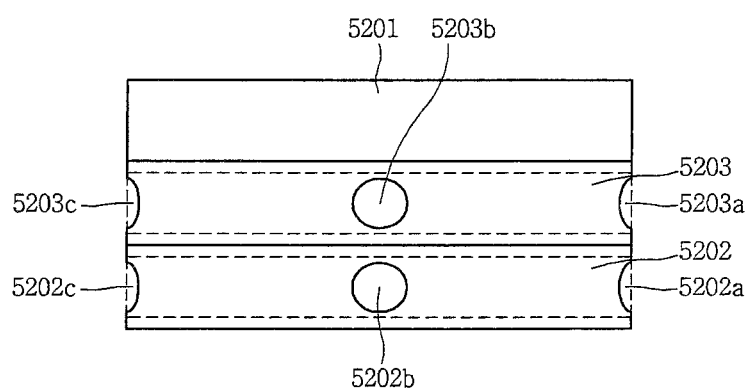
Figure 6C:
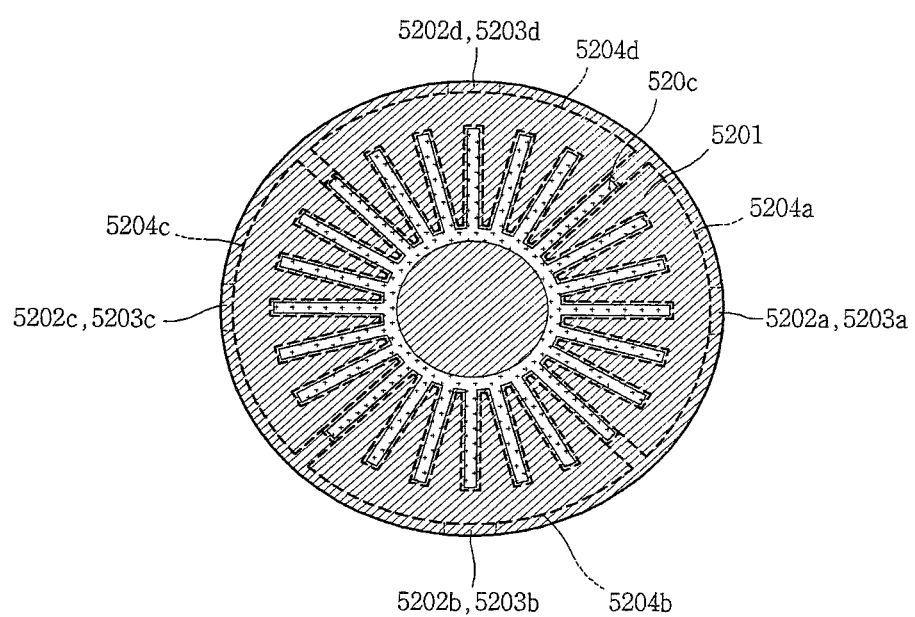

FIGS. 6A through 6C are views for specifically explaining a heat exchange section 520 of FIGS. 5A through 5C.

FIG. 6A is an enlarged view of the conceptual view of a heat exchange section 520.

FIG. 6B is a side view of the heat exchange section 520. In addition, FIG. 6C is a top view of the heat exchange section 520.

Referring to FIGS. 6A through 6C, the heat exchange section 520 may include an inlet header 5202, an outlet header 5203, an internal flow path 5204, and structures 5201, 5201' for forming the internal flow path 5204, and may be formed to include a core catcher including a core melt flow path 520c capable of receiving and cooling the core melt during a severe accident.

In detail, the heat exchange section 520 arranges the inlets 5202a, 5202b, 5202c, 5202d in the inlet header 5202 to inject a fluid (a fluid during a normal operation, IRWST refueling water during a severe accident) 5204) into the internal flow path 129. In addition, the inner flow path 5204 may be formed in a U-shape so as to surround the structure 5201' so that fluid at low temperature surrounds the structure 5201' and receives heat while rotating the structure 121' to increase the temperature. Further, the fluid having the increased temperature while passing through the internal flow path 5204 may be discharged to the outlets 5203a, 5203b, 5203c, 5203d of the outlet header 5203.

In detail, as illustrated in FIG. 6C, the heat exchange section 520 may be formed to allow the fluid to flow into the inlet 5202a and be discharged to the outlet 5203a through the flow path 5204a. In addition, the inlets 5202a through 5202d may be formed to correspond to the flow paths 5204a to 5204d and the outlets 5203a to 5203d, respectively.

The core melt generated by the melting of the core during a severe accident may be cooled by the fluid (IRWST refueling water) while spreading radially from a central portion of the heat exchange section 520 to its edge along the core melt flow path 520c.

Figure 7A:
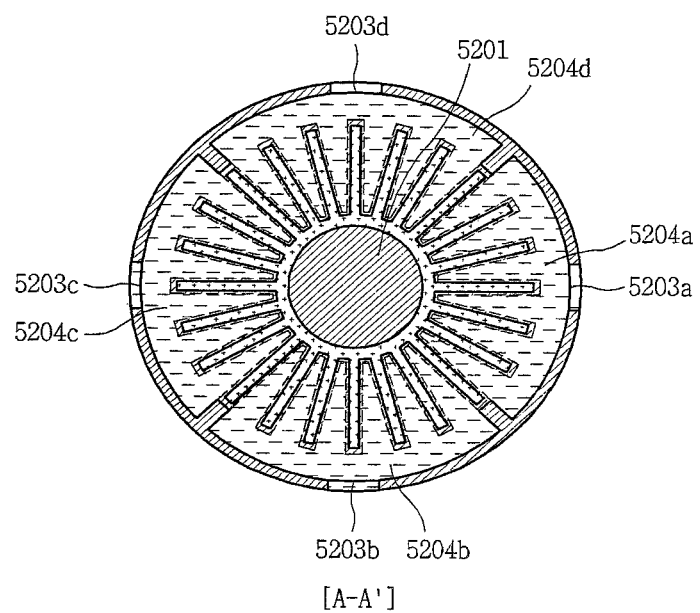
FIG. 7A is a top cross-sectional view of the heat exchange section cut along line A-A' in FIG. 6A.
Figure 7B:
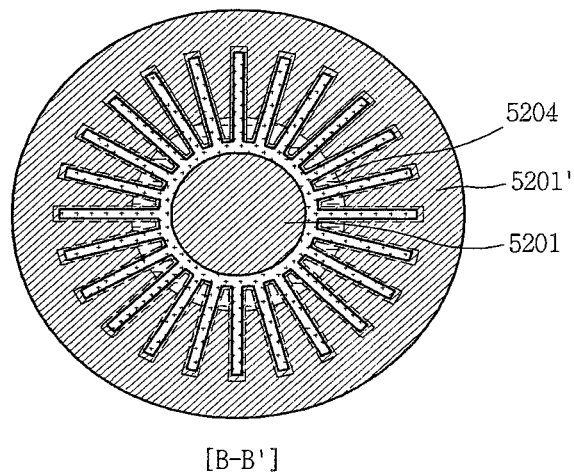
FIG. 7B is a middle cross-sectional view of the heat exchange section cut along line B-B' in FIG. 6A.
Figure 7C:
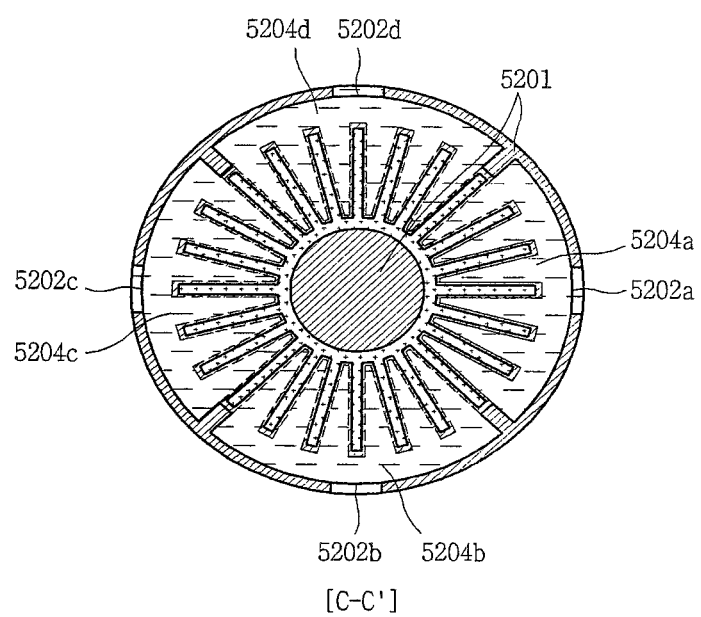
FIG. 7C is a bottom cross-sectional view of the heat exchange section cut along line C-C' in FIG. 6A.

FIGS. 7A through 7C are cross-sectional views taken along lines A-A', B-B' and C-C', respectively, of the heat exchange section 520 in FIG. 6A.

Specifically, FIG. 7A is a top cross-sectional view of the heat exchange section 520 cut along line A-A' in FIG. 6A. Referring to FIG. 7A, a fluid having an increased temperature while passing through the flow paths 5204a to 5204d of the heat exchange section 520 cut along line A-A' may be formed to be discharged to the outlets 5203a, 5203b, 5203c, 5203d.

Furthermore, FIG. 7B is a middle cross-sectional view of the heat exchange section 520 cut along line B-B' in FIG. 6A. Referring to FIG. 7B, a fluid (a fluid during a normal operation, refueling water during a severe accident) is formed to circulate upward from the bottom to the top while passing through the internal flow path 5204 of the heat exchange section 520 cut along B-B', and the fluid is formed to receive heat while circulating upward so as to increase the temperature of the fluid.

Moreover, FIG. 7C is a bottom cross-sectional view of the heat exchange section 520 cut along line C-C' in FIG. 6A. Referring to FIG. 7C, the heat exchange section 520 may be formed such that the fluid having a low temperature flows into the inlets 5202a, 5202b, 5202c, 5202d of the heat exchange section 520 cut along the line C-C', and passes through the flow paths 5204a through 5204d to be discharged to the outlets 5203a, 5203b, 5203c, 5203d at an upper portion of the heat exchange section 120. In addition, since the heat exchange section 520 can be configured in various similar forms, the present disclosure is not limited to a form of this embodiment.

Figure 8:
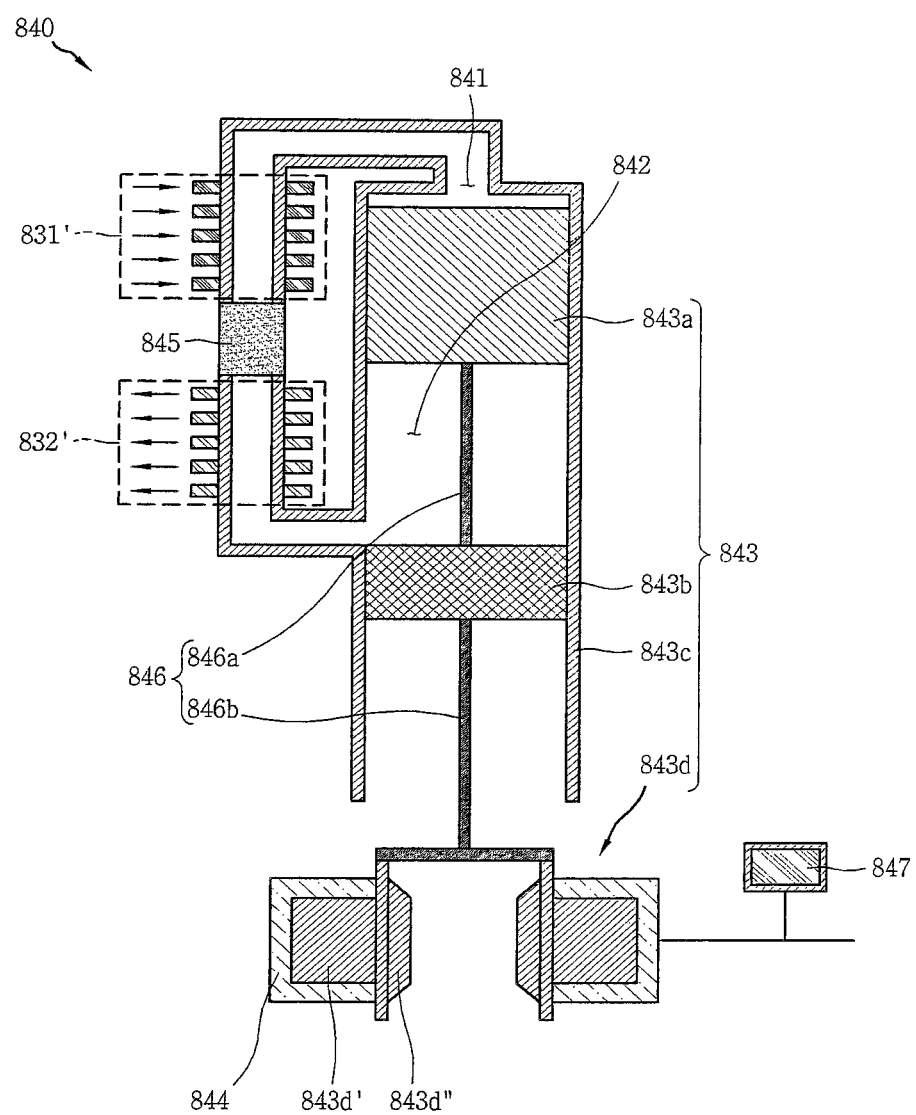
Figure 9:
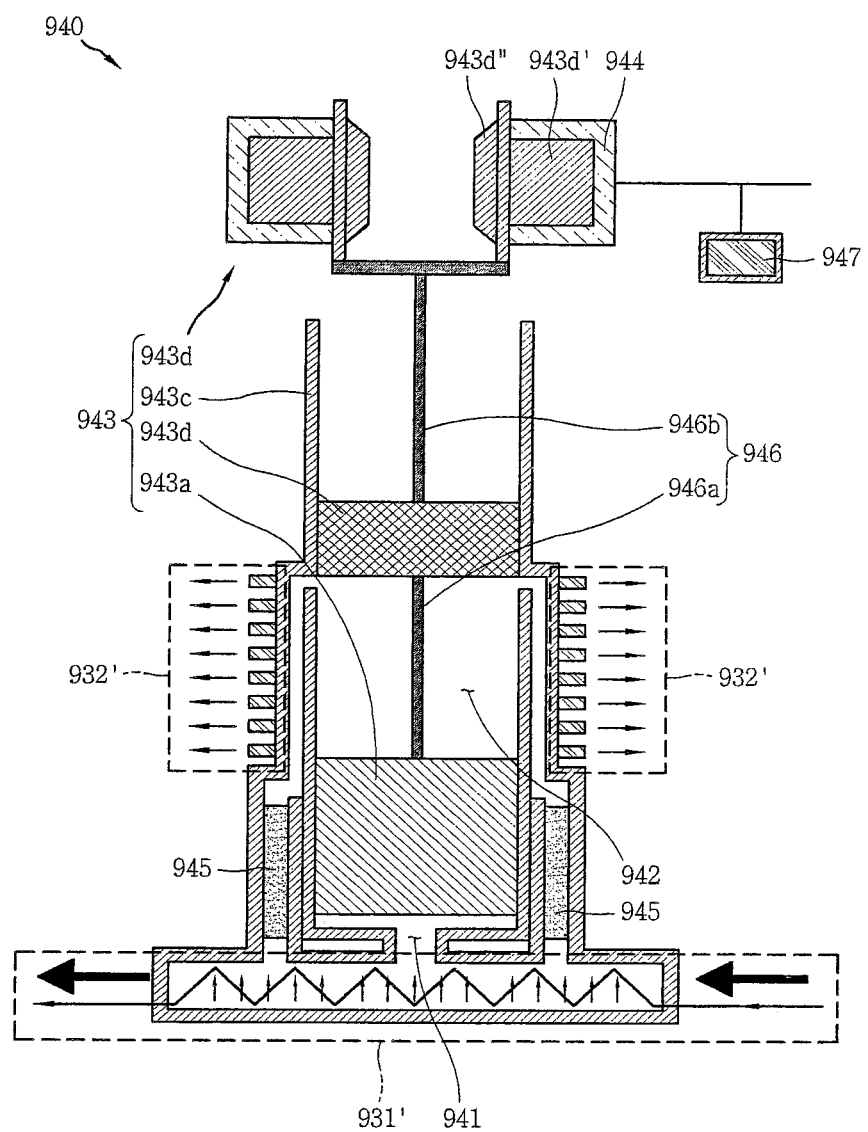
Figure 10:
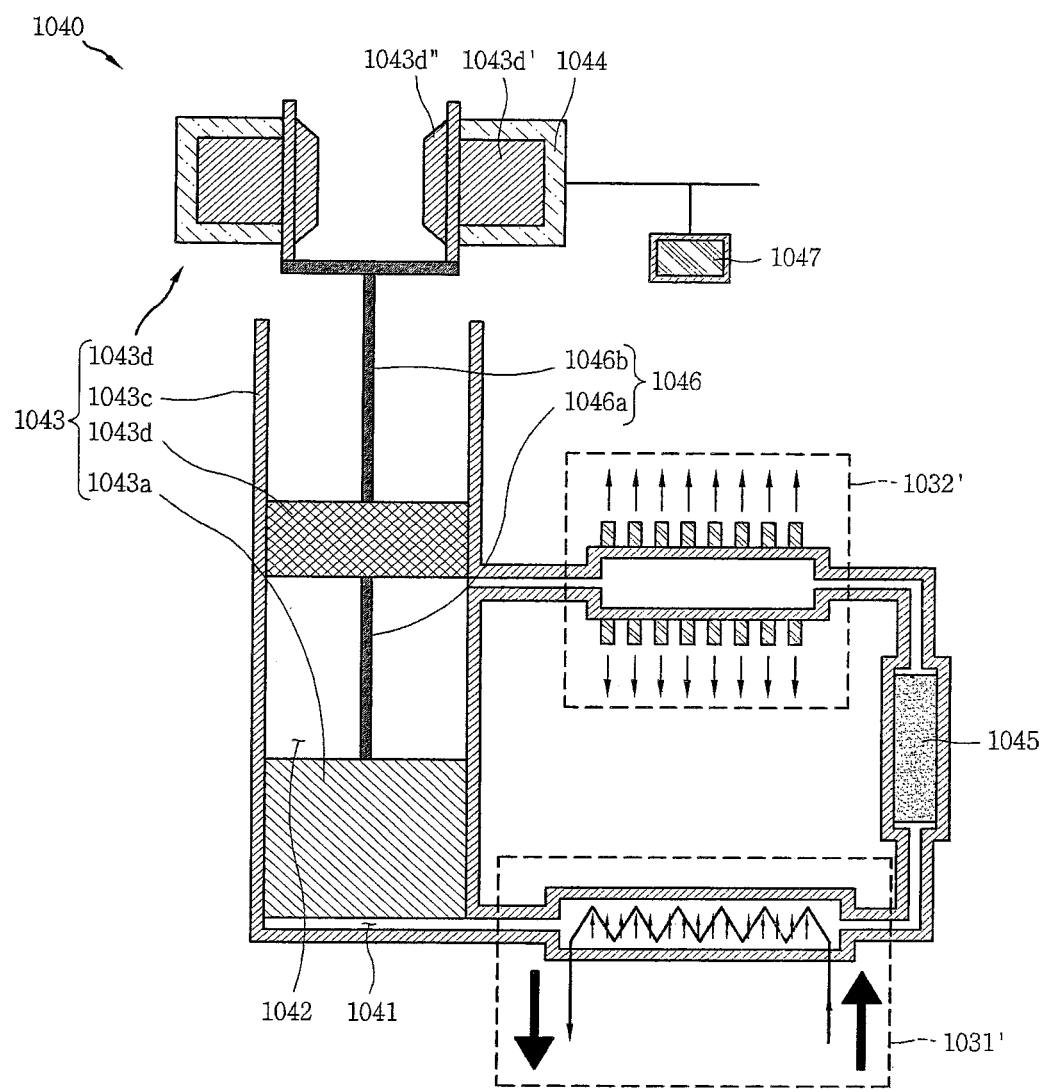
FIG. 10 is a conceptual view illustrating a forced circulation operation of a reactor cooling and power generation system during a nuclear design basis accident associated with an embodiment of the present disclosure.

FIGS. 8 through 10 are conceptual views illustrating various embodiments of a Stirling engine applied to a reactor cooling and power generation system of the present disclosure.

Referring to FIG. 8, the Stirling engine 840 may include a first heat exchange section 831' capable of receiving heat from a heat exchanger (not shown) provided adjacent to the Stirling engine 840. The first heat exchanging part 831' may be formed to transfer heat to the high temperature section 841.

Meanwhile, a second heat exchange section 832' for dissipating heat transferred from the Stirling engine 840 may be provided. Specifically, the second heat exchange section 832' may be connected to a low temperature section 842 to discharge the heat of the working gas transferred from the low temperature section 842 to the outside.

The high temperature section 841 and the low temperature section 842 may be connected to each other in a communicable manner by a first heat exchange section 831, a second heat exchange section 832, a regenerative heat exchange section 833, and a connection flow path. For example, one end portion of the connecting flow path is connected to the high temperature section 841, the other end portion of the connecting flow path is connected to the low temperature section 842, and thus the working gas flows from the high temperature section 841 to the low temperature section 842 or from the high temperature section 842 to the high temperature section 841 through the first heat exchange section 831, the second heat exchange section 832, the regenerative heat exchange section 833, and the connecting flow path.

Moreover, the regenerative heat exchange section 845 may be further provided between the first heat exchange section 831 and the second heat exchange section 832 which reciprocate between the high temperature section 841 and the low temperature section 842. The regenerative heat exchange section 845 is a component for increasing the performance and efficiency of the Stirling engine 840.

A power production section 843 of the Stirling engine 840 may include a reciprocator 843a, a piston 843b and a connecting rod 846 inside a cylinder 843c. The connecting rod 846 may include a plurality of connecting rods 846a, 846b. The power production section 843 produces reciprocating power while working gas between the high temperature section 841 and the low temperature section 842 passes through the processes of heating, expansion, cooling, and compression, and the reciprocating power may be transferred to the power transmission section 843d by the connecting rods 846a, 846b.

The power transmission section 843d may be mechanically connected to the rotation sections 843d', 843d" to generate rotational power, and the rotational power may be converted into electric energy through the electricity generation section 844.

On the other hand, referring to the layout of the power production section 843, the first heat exchange section 831' and the second heat exchange section 832', the cylinder 843c, the first heat exchange section 831' and the second heat exchange section 832' are arranged side by side. Furthermore, the first heat exchange section 831' and the second heat exchange section 832' are continuously connected to each other on the same plane, and the regenerative heat exchange section 845 may be disposed adjacent between the first heat exchange section 831' and the second heat exchange section 832'.

In addition, the Stirling engine 840 may include a battery 847 to provide power for an initial engine operation or store the produced electric power.

According to still another embodiment electric power production section 230 described below, the same or similar reference numerals are designated to the same or similar configurations to the foregoing example, and the description thereof will be substituted by the earlier description.

Referring to FIG. 9, a first heat exchange section 931' connected to a high temperature section 941 may be disposed below the Stirling engine 940. Furthermore, the second heat exchange section 932' of the Stirling engine 940 may be disposed to surround at least a part of a cylinder 943c so as to enclose at least a part of a low temperature section 942. As a result, the processes of heating, expansion, cooling and compression by working gas between the high temperature section 941 and the low temperature section 942 may be carried out by heat exchange through the first heat exchange section 931' and the second heat exchange section 932'.

On the other hand, a regenerative heat exchange section 945 may be disposed between the first heat exchange section 931' and the second heat exchange section 932', and may have a shape of surrounding at least a part of the cylinder 943c.

Referring to FIG. 10, the first heat exchange section 1031' of the Stirling engine 1040 may be disposed in parallel with the cylinder 1043c in connection with the high temperature section 1041 at a lower portion of the Stirling engine 1040. Furthermore, the second heat exchange section 1032' of the Stirling engine 1040 may be disposed in parallel with the cylinder 1043c in connection with the low temperature section 1042. Moreover, the first heat exchange section 1031' and the second heat exchange section 1032' may be arranged in parallel to each other, and a bent pipe may be connected between the first heat exchange section 1031' and the second heat exchange section 1032', and a regenerative heat exchange section 1045 may be disposed on the bent pipe.

Although the reactor cooling and power generation system and the Sterling engine according to various embodiments of the present disclosure have been described above, the present disclosure is not limited to the foregoing reactor cooling and power generation system and the Sterling engine, and may include a nuclear power plant having the same.

In detail, the nuclear power plant of the present disclosure may include a reactor vessel, a heat exchange section formed to receive heat generated from a core inside the reactor vessel through a fluid, and an electric power production section including a Stirling engine formed to produce electrical energy using the energy of the fluid whose temperature has increased while receiving the heat of the reactor, and may be formed to circulate the fluid that has received heat from the core through the electric power production section, and formed to operate even during a normal operation and during an accident of the nuclear power plant to produce electric power.

It is obvious to those skilled in the art that the present disclosure can be embodied in other specific forms without departing from the concept and essential characteristics thereof.

In addition, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A system, comprising:
   a nuclear reactor vessel configured to include a nuclear reactor coolant system and to circulate nuclear reactor coolant of the nuclear reactor coolant system;
   a feedwater system for producing electric power connected to the nuclear reactor vessel;
   a steam generator inside of the nuclear reactor vessel;
   a turbine configured to produce electric power from the feedwater system; and
   a nuclear reactor cooling and power generation system configured to produce electric power during an accident of a nuclear power plant to produce electric power,
   the nuclear reactor cooling and power generation system for producing electric power comprising:
   a heat exchange section formed to include a fluid inside the heat exchange section and formed to receive heat generated from a core inside the nuclear reactor vessel to the fluid during a normal operation of the nuclear power plant; and
   an electric power production section comprising a Stirling engine formed to produce electric energy using the energy of the fluid whose temperature has increased while receiving the heat of the nuclear reactor, and
   wherein the heat exchange section is fluidly separated from the feedwater system, the steam generator, and the turbine,
   wherein during the normal operation of the nuclear power plant, steam produced by the steam generator is passed through a main steam line and supplied to the turbine to produce electric power, and
   wherein the nuclear reactor cooling and power generation system is formed to circulate the fluid that has received heat from the core in the heat exchange section through the electric power production section, and operates even during the normal operation and during the accident of the nuclear power plant, to produce electric power.

2. The system of claim 1, wherein the electric power produced during the normal operation of the nuclear power plant is supplied to an internal and external electric power system and an emergency battery.

3. The system of claim 2, wherein the electric energy charged in the emergency battery is formed to supply an emergency electric power as an emergency power source during an accident.

4. The system of claim 1, wherein the electric power produced during an accident of the nuclear power plant is formed to be supplied to an emergency power source of the nuclear power plant.

5. The system of claim 3, wherein the emergency power source is formed to supply an electric power for the operation of a nuclear safety system or valve manipulating for the operation of the nuclear safety system or monitoring the nuclear safety system or operation of the nuclear reactor cooling and power generation system during an accident of the nuclear power plant.

6. The system of claim 1, wherein a seismic design of seismic category I, II or III is applied thereto.

7. The system of claim 1, wherein a safety grade of safety class 1, 2 or 3 is applied thereto.

8. The system of claim 1, further comprising:
   a first discharge section connected to the heat exchange section,
   wherein the first discharge section is formed to discharge at least a part of the fluid excessively supplied to the electric power production section.

9. The system of claim 8, wherein the heat exchange section is formed to surround at least a part of the nuclear reactor vessel, and has a shape capable of cooling an outer wall of the nuclear reactor vessel formed to receive heat discharged from the nuclear reactor vessel that has received heat generated from the core.

10. The system of claim 9, wherein at least a part of the shape of the heat exchange section having a shape of cooling the outer wall of the nuclear reactor vessel comprises a cylindrical shape, a hemispherical shape, a double vessel shape, or a mixed shape thereof.

11. The system of claim 9, further comprising:
    an in-containment refueling water storage tank (IRWST) configured to supply refueling water to the heat exchange section having a shape capable of cooling the outer wall of the nuclear reactor vessel.

12. The system of claim 11, further comprising:
    a second discharge section provided in a heat exchange section having a shape capable of cooling the outer wall of the nuclear reactor vessel,
    wherein the second discharge section is formed to discharge the refueling water supplied from the in-containment refueling water storage tank (IRWST).

13. The system of claim 9, wherein a coating member is further formed on the heat exchange section having a shape capable of cooling the outer wall of the nuclear reactor vessel to prevent the corrosion of the nuclear reactor vessel.

14. The system of claim 13, wherein a surface of the coating member is chemically treated to increase a surface area thereof.

15. The system of claim 9, wherein a heat transfer member is further formed to transfer heat discharged from the nuclear reactor vessel.

16. The system of claim 15, wherein a surface of the heat transfer member is chemically treated to increase a surface area thereof.

17. The system of claim 8, wherein the heat exchange section is provided inside the nuclear reactor vessel, and has a shape capable of cooling an inside of the nuclear reactor vessel formed to receive heat discharged from a nuclear reactor coolant system inside the nuclear reactor vessel that has received heat generated from the core.

18. The system of claim 17, further comprising:
an in-containment refueling water storage tank (IRWST) configured to supply refueling water to the heat exchange section having a shape capable of cooling an inside of the nuclear reactor vessel.

19. The system of claim 18, further comprising:
a second discharge section is provided in a heat exchange section having a shape capable of cooling the inside of the nuclear reactor vessel, and
wherein the second discharge section is formed to discharge the refueling water supplied from the in-containment refueling water storage tank (IRWST).

20. The system of claim 1, further comprising:
an evaporator section connected to the heat exchange section,
wherein the evaporator section is formed to exchange heat with an inner fluid of the heat exchange section and an inner fluid of the electric power production section, and comprises a first circulation section formed to circulate through the heat exchange section and the evaporator section; and a second circulation section formed to circulate through the evaporator section and the electric power production section.

21. The system of claim 20, wherein at least one of the first circulation section and the second circulation section is formed to circulate by a single-phase fluid.

22. The system of claim 1, wherein the heat exchange section further comprises a core catcher, and the core catcher is formed to receive and cool a melted core when the core is melted in the nuclear reactor vessel.

23. The system of claim 1, wherein the Stirling engine comprises:
a power generation section comprising a cylinder having a reciprocator and a piston configured to generate motive power by heat received through the fluid that has received heat, and a power transmission section; and an electricity generation section configured to convert mechanical energy generated by the power generation section into electrical energy.

24. The system of claim 1, wherein the Stirling engine comprises a first temperature section and a second temperature section respectively filled with working gas, and formed with spaces partitioned from each other inside a cylinder, and
working gases filled in the first temperature section and the second temperature section are formed to communicate with each other, and formed to move a reciprocator and a piston according to the communication of the working gas.

25. The system of claim 24, wherein the Stirling engine further comprises a regenerative heat exchange section, and
the regenerative heat exchange section transfers and stores heat stored in the working gas in the regenerative heat exchange section when the working gas moves from the first temperature section to the second temperature section, and transfers the heat stored in the regenerative heat exchange section to the working gas when the working gas returns from the low second temperature section to the first temperature section.

26. The system of claim 24, wherein a fan or a pump is provided in the second temperature section, and
the fan or the pump is formed to supply a cooling fluid to the second temperature section to exchange heat with the working gas of the second temperature section.

27. The system of claim 26, wherein the cooling fluid comprises air, pure water, seawater, or a mixture thereof.

28. The system of claim 1, further comprising:
a condensate storage section at a lower portion of the electric power production section to collect condensate generated by condensing the fluid heat-exchanged in the electric power production section.

29. The system of claim 28, wherein condensate in the condensate storage section is supplied to the heat exchange section by gravity or the power of the pump.

* * * * *